(12) United States Patent  
Zhang et al.

(10) Patent No.: US 12,253,655 B2  
(45) Date of Patent: Mar. 18, 2025

(54) OPTICAL SYSTEM, LENS MODULE, AND TERMINAL DEVICE

(71) Applicant: JIANGXI JINGCHAO OPTICAL CO., LTD., Jiangxi (CN)

(72) Inventors: Wenyan Zhang, Jiangxi (CN); Ming Li, Jiangxi (CN); Jian Yang, Jiangxi (CN); Hairong Zou, Jiangxi (CN)

(73) Assignee: JIANGXI JINGCHAO OPTICAL CO., LTD., Jiangxi (CN)

( * ) Notice: Subject to any disclaimer, the term of this patent is extended or adjusted under 35 U.S.C. 154(b) by 643 days.

(21) Appl. No.: 17/470,606

(22) Filed: Sep. 9, 2021

(65) Prior Publication Data

US 2021/0405331 A1 Dec. 30, 2021

Related U.S. Application Data

(63) Continuation of application No. PCT/CN2020/083348, filed on Apr. 3, 2020.

(51) Int. Cl.
 *G02B 9/60* (2006.01)
 *G02B 13/00* (2006.01)

(52) U.S. Cl.
 CPC ........... *G02B 13/0045* (2013.01); *G02B 9/60* (2013.01)

(58) Field of Classification Search
 CPC ....... G02B 13/0045; G02B 9/60; G02B 5/005
 See application file for complete search history.

(56) References Cited

U.S. PATENT DOCUMENTS

| 2012/0162769 | A1 | 6/2012 | Suzuki et al. | |
| 2013/0301147 | A1 | 11/2013 | Yamada | |
| 2015/0070783 | A1* | 3/2015 | Hashimoto | G02B 27/0025 359/708 |
| 2015/0146309 | A1* | 5/2015 | Ota | G02B 13/0045 359/757 |

(Continued)

FOREIGN PATENT DOCUMENTS

| CN | 102650727 A | 8/2012 |
| CN | 102854609 A | 1/2013 |

(Continued)

OTHER PUBLICATIONS

Gross, VCH Verlag GmbH & Co. KGaA, vol. 3, pp. 378-379 (Year: 2007).*

(Continued)

*Primary Examiner* — Marin Pichler  
*Assistant Examiner* — Mackenzi Waddell  
(74) *Attorney, Agent, or Firm* — Hauptman Ham, LLP

(57) ABSTRACT

An optical system, a lens module, and a terminal device are provided. The optical system includes a first lens with a positive refractive power, a second lens with a refractive power, a third lens with a refractive power, a fourth lens with a positive refractive power, and a fifth lens with a refractive power. The first lens has an object-side surface which is convex at an optical axis. The third lens has an object-side surface which is concave at the optical axis. The fourth lens has an image-side surface which is convex at the optical axis. The fifth lens has an object-side surface which is concave at the optical axis and an image-side surface which is convex at the optical axis. The optical system satisfies the following expression: $0.25<\mathrm{ftgtl3/ftltl3}<0.8$.

20 Claims, 15 Drawing Sheets

(56) References Cited

U.S. PATENT DOCUMENTS

2015/0338611 A1* 11/2015 Jung ................. G02B 9/62
359/713
2021/0294079 A1   9/2021 Chen et al.

FOREIGN PATENT DOCUMENTS

| CN | 106814436 | A |   | 6/2017  |        |             |
|----|-----------|---|---|---------|--------|-------------|
| CN | 107085284 | A |   | 8/2017  |        |             |
| CN | 108152936 | A |   | 6/2018  |        |             |
| CN | 108398769 | A |   | 8/2018  |        |             |
| CN | 109683287 | A |   | 4/2019  |        |             |
| CN | 209388015 | U |   | 9/2019  |        |             |
| CN | 110673310 | A |   | 1/2020  |        |             |
| CN | 110873948 | A |   | 3/2020  |        |             |
| CN | 110927939 | A |   | 3/2020  |        |             |
| CN | 211786330 | U |   | 10/2020 |        |             |
| CN | 112433349 | A |   | 3/2021  |        |             |
| JP | 2011227362| A | * | 11/2011 | ...... | G02B 13/004 |
| KR | 2015089134| A | * | 8/2015  | ...... | G02B 13/0045|

OTHER PUBLICATIONS

The International Search Report issued in corresponding International Application No. PCT/CN2020/083348, mailed Jan. 4, 2021, pp. 1-10, Beijing, China.
First Office Action issued in corresponding CN application No. 202010261413.0 dated Nov. 25, 2024.

* cited by examiner

OPTICAL SYSTEM, LENS MODULE, AND TERMINAL DEVICE

CROSS-REFERENCE TO RELATED APPLICATIONS

The present application is a continuation of International Application No. PCT/CN2020/083348, filed on Apr. 3, 2020, the disclosure of which is hereby incorporated by reference in its entirety.

TECHNICAL FIELD

This disclosure relates to the technical field of optical imaging, and in particular to an optical system, a lens module, and a terminal device.

BACKGROUND

With the widespread use of electronic products such as mobile phones, tablet computers, drones, and computers in daily life, various technological improvements have brought forth the new. The improvement and innovation of the imaging effect of the camera lens in the new electronic products have attracted attention from people.

At present, as the demand for shooting distant views increases, the camera lens needs to have a long focal length. However, it may bring the problem of field curvature and the overall image quality is difficult to guarantee, resulting in poor effect of distant-view shooting.

Therefore, how to achieve distant-view shooting with high-definition and without field curvature, so that a scene with a long object distance can be clearly imaged on an imaging surface should be a research and development direction in the industry.

SUMMARY

Implementations of the disclosure provide an optical system, a lens module, and a terminal device. The optical system can solve the problem of poor image quality in distant-view shooting and achieve distant-view shooting with high-definition.

In a first aspect, the disclosure provides an optical system. The optical system includes, in order from an object side to an image side, a first lens with a positive refractive power, a second lens with a refractive power, a third lens with a refractive power, a fourth lens with a positive refractive power, and a fifth lens with a refractive power. The first lens has an object-side surface which is convex at an optical axis. The third lens has an object-side surface which is concave at the optical axis. The fourth lens has an image-side surface which is convex at the optical axis. The fifth lens has an object-side surface which is concave at the optical axis and an image-side surface which is convex at the optical axis. The optical system satisfies the following expression: $0.25 < \text{ftgtl3}/\text{ftltl3} < 0.8$, where ftgtl3 represents a shortest distance from the object-side surface of the third lens to an image-side surface of the third lens in a direction parallel to the optical axis, and ftltl3 represents a longest distance from the object-side surface of the third lens to the image-side surface of the third lens in the direction parallel to the optical axis.

By appropriately configuring the refractive powers and surface profiles of the first lens, the second lens, the third lens, the fourth lens, and the fifth lens of the optical system, the optical system can have a long focal length and good imaging quality, which can achieve distant-view shooting with high-definition. At the same time, configuring $0.25 < \text{ftgtl3}/\text{ftltl3} < 0.8$ can effectively balance an optical path difference of the optical system, correct field curvature, and avoid distortion around the image, such that the imaging effect can more truly reflect the captured object, and the captured image has high image quality, high resolution, and high definition.

In an implementation, the optical system satisfies the following expression: $7\text{ mm} < \text{FNO}*\text{L1SD}/\tan\text{FOV} < 15\text{ mm}$, where FNO represents an F-number of the optical system, L1SD represents an aperture of the first lens, and tan FOV represents a tangent value of a maximum angle of view of the optical system. The F-number of the optical system and the aperture of the first lens determine the amount of incident light into the optical system, and a size of the angle of view of the optical system determines the field range of imaging. By properly limiting $\text{FNO}*\text{L1SD}/\tan\text{FOV}$, the optical system can have both enough amount of incident light and an appropriate field range. If $\text{FNO}*\text{L1SD}/\tan\text{FOV} \geq 15\text{ mm}$, there may be excessive amount of light incident into the optical system, which may degrade the optical performance. If $\text{FNO}*\text{L1SD}/\tan\text{FOV} < 7\text{ mm}$, it will reduce brightness of the imaging surface, which may reduce the image quality.

In an implementation, the optical system satisfies the following expression: $0.5 < \text{L1SD}/\text{Imgh} < 0.8$, where L1SD represents an aperture of the first lens, and Imgh represents half of a diagonal length of an effective pixel region of the optical system on an imaging surface. The aperture of the first lens of the optical system determines the amount of incident light into the optical system, and a size of the imaging surface determines definition and a pixel size of the optical system. Only a reasonable configuration of the range of L1SD/Imgh can ensure enough amount of incident light, so as to ensure the definition of the captured image. If $\text{L1SD}/\text{Imgh} > 0.8$, It will cause excessive exposure and brightness, which will affect the image quality. If $\text{L1SD}/\text{Imgh} < 0.5$, it will cause insufficient incident light and insufficient relative brightness, which will reduce definition of the image.

In an implementation, the optical system satisfies the following expression: $1 < \text{EFL}/\text{f1} < 3$, where EFL represents an effective focal length of the optical system, and f1 represents a focal length of the first lens. A reasonable configuration of the focal length of the first lens and the effective focal length of the optical system is beneficial to optimize the imaging performance of the optical system and reduce sensitivity of the optical system. If $\text{EFL}/\text{f1} \leq 1$, it may lead to an increased sensitivity of the optical system and a difficult processing technology, and an aberration produced by the first lens may be more difficult to correct, so that it is difficult to meet the shooting needs. If $\text{EFL}/\text{f1} > 3$, the focal length of the first lens is not configured properly with the effective focal length of the optical system, and the aberration caused by the first lens cannot be corrected.

In an implementation, the optical system satisfies the following expression: $0.05 < \text{airL2}/\text{TTL} < 0.35$, where airL2 represents a distance from an image-side surface of the second lens to the object-side surface of the third lens on the optical axis, and TTL represents a distance from the object-side surface of the first lens to an imaging surface of the optical system on the optical axis. By properly limiting the range of airL2/TTL, it is helpful to reduce the assembly sensitivity of the optical system and improve the production yield. If $\text{airL2}/\text{TTL} > 0.35$, the system will be too long and cannot meet the requirement on miniaturization design. If airL2/TTL<0.05, it will increase the sensitivity of the optical system, thus reducing the production yield.

In an implementation, the optical system satisfies the following expression: $-1<(|R9|-|R10|)(|R9|+|R10|)<0.1$, where R9 represents a radius of curvature of the object-side surface of the fifth lens at the optical axis, and R10 represents a radius of curvature of the image-side surface of the fifth lens at the optical axis. By limiting the range of $(|R9|-|R10|)/(|R9|+|R10|)$, the spherical aberration of the optical system can be corrected, the optical path difference of the optical system can be balanced, the field curvature can be corrected, the sensitivity of the system can be reduced, and the assembly stability can be improved. If $(|R9|-|R10|)/(|R9|+|R10|)>0.1$, the field curvature of the optical system may be too large. If $(|R9|-|R10|)/(|R9|+|R10|)<-1$, it will increase the system sensitivity and reduce the production yield.

In an implementation, the optical system further include a stop, and the optical system satisfies the following expression: $0.3<DL/TTL<0.6$, where DL represents an aperture of the stop of the optical system, and TTL represents a distance from the object-side surface of the first lens to an imaging surface of the optical system on the optical axis. By appropriately limiting the range of DL/TTL, it is beneficial to the miniaturization of the optical system and provides sufficient light for shooting, thus achieving a high-quality and high-definition shooting effect. If DL/TTL>0.6, the aperture for passing light will be too large, and edge light will enter the optical system, which may reduce the image quality. If DL/TTL<0.3, the aperture of the stop will be too small to satisfy the amount of light required by the optical system, so that the requirement on distant-view shooting with high definition cannot be achieved.

In an implementation, the optical system satisfies the following expression: $FNO/TTL<0.5$ mm$^{-1}$, where FNO represents an F-number of the optical system, and TTL represents a distance from the object-side surface of the first lens to an imaging surface of the optical system on the optical axis. By appropriately limiting the range of FNO/TTL, the miniaturization of the optical system can be achieved, and sufficient incident light can be provided for distant-view shooting, so as to meet the requirement on high-quality and high-definition shooting. If $FNO/TTL>0.5$ mm$^{-1}$, the incident light into the optical system will be insufficient, thus reducing the definition of the captured image.

In an implementation, the optical system satisfies the following expression: $0.8<TTL/EFL<1$, where TTL represents a distance from the object-side surface of the first lens to an imaging surface of the optical system on the optical axis, and EFL represents an effective focal length of the optical system. By limiting the range of TTL/EFL, the focal length of the optical system and the total length of the optical system can be reasonably controlled, which can not only realize the miniaturization of the optical system, but also ensure that the light is better converged on the imaging surface. If TTL/EFL≤0.8, the total length of the optical system is too short, which will increase sensitivity of the optical system and is unfavorable for convergence of light on the imaging surface. If TTL/EFL≥1, the total length of the optical system is too long, so that an incident angle of the chief ray on the imaging surface will be too large, and the edge rays cannot be incident on the imaging surface, resulting in incomplete imaging information.

In an implementation, the optical system satisfies the following expression: $1.5<EFL/Imgh<2$, where EFL represents an effective focal length of the optical system, and Imgh represents half of a diagonal length of an effective pixel region of the optical system on an imaging surface. By limiting the range of EFL/Imgh, the focal length and an image height of the optical system can be reasonably controlled, which can not only achieve distant-view shooting with high definition, but also ensure that the light is better converged on the imaging surface. If EFL/Imgh≤1.5, the focal length will be reduced under the condition that the image height remains unchanged, which cannot meet the requirement on distant-view shooting. If EFL/Imgh≥2, it cannot be guaranteed that the light will converge on the imaging surface.

In a second aspect, the disclosure provides a lens module. The lens module includes a photosensitive element and the optical system of any of implementations described above. The photosensitive element is arranged at the image side of the optical system.

In a third aspect, the disclosure provides a terminal device. The terminal device includes the lens module of the second aspect.

By appropriately configuring the refractive powers and surface profiles of the first lens, the second lens, the third lens, the fourth lens, and the fifth lens of the optical system, the optical system can have a long focal length and good image quality, which can achieve distant-view shooting with high-definition. At the same time, configuring $0.25<ftgtl3/ftltl3<0.8$ can effectively balance an optical path difference of the optical system, correct field curvature, and avoid distortion around the image, such that the imaging effect can more truly reflect the captured object, and the captured image has high image quality, high resolution, and high definition.

BRIEF DESCRIPTION OF THE DRAWINGS

In order to more clearly describe the technical solutions in the embodiments of the present disclosure or the prior art, the following will describe the drawings that need to be used in the embodiments of the present application or the prior art.

DETAILED DESCRIPTION

Embodiments of the disclosure will be described in conjunction with the accompany drawing.

Figure 1:
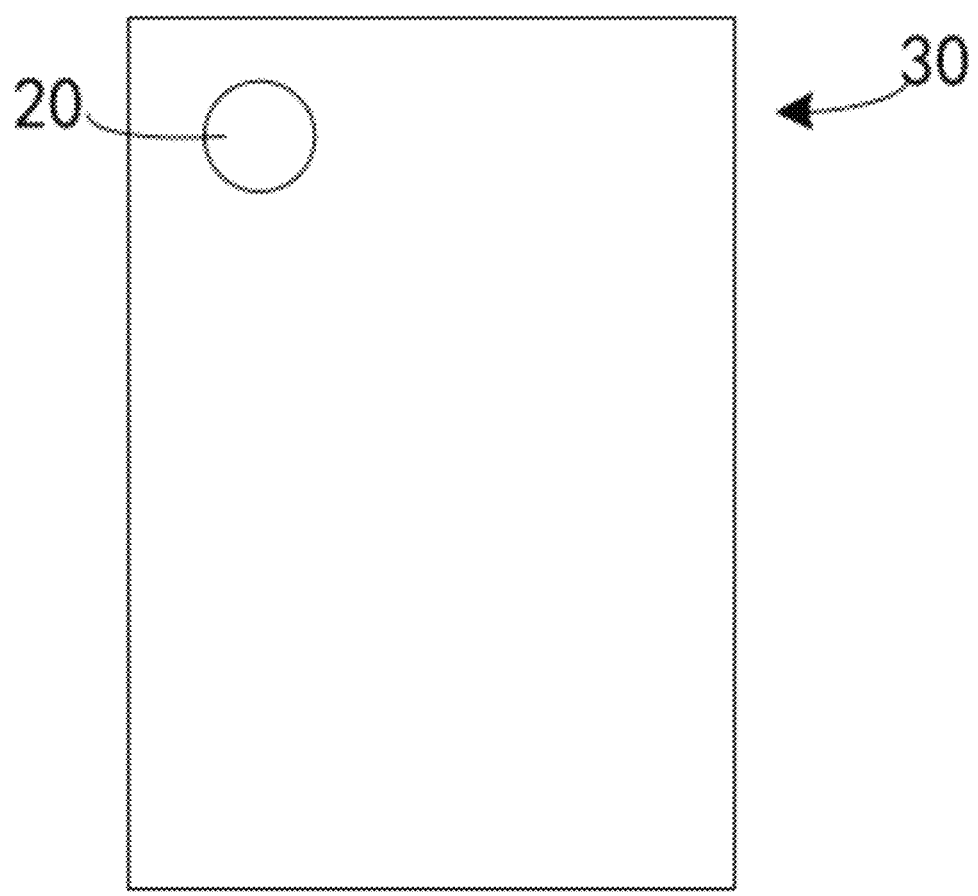
FIG. 1 is schematic diagram illustrating an optical system applied in a terminal device according to the disclosure.

Referring to FIG. 1, an optical system disclosed herein is applied to a lens module 20 in a terminal device 30. The terminal device 30 may be a mobile phone, a tablet, a drone, a computer, or other device. The lens module 20 has a photosensitive element disposed at an image side of the optical system. The lens module 20 is installed inside the terminal device 30.

The disclosure provides a lens module including a photosensitive element and an optical system provided in the disclosure. The photosensitive element is disposed at an image side of the optical system. The photosensitive element is used for converting the light passing through the first lens to the fifth lens and incident on the electronic photosensitive element into an electrical signal of an image. The electronic photosensitive element may be a complementary metal oxide semiconductor (CMOS) or a charge-coupled device (CCD). By installing the optical system in the lens module, the lens module has a long focal length and good imaging quality, and distant-view shooting with high definition can be realized.

The disclosure further provides a terminal device. The terminal device includes the lens module provided in the disclosure. The terminal device may be a mobile phone, a tablet, a drone, a computer, or other device. By installing the lens module in the terminal device, the terminal device has characteristics of a long focal length and good imaging quality, and distant-view shooting with high definition can be realized.

An optical system provided in the disclosure includes five lenses. The five lenses includes, in order from an object side to an image side, a first lens, a second lens, a third lens, a fourth lens, and a fifth lens.

Surface profiles and refractive powers of the five lenses are as follows.

The first lens has a positive refractive power. The first lens has an object-side surface which is convex at an optical axis. The second lens has a refractive power. The third lens has a refractive power. The third lens has an object-side surface which is concave at the optical axis. The fourth lens has a refractive power. The fourth lens has an image-side surface which is convex at the optical axis. The fifth lens has a refractive power. The fifth lens has an object-side surface which is concave at the optical axis and an image-side surface which is convex at the optical axis.

The optical system satisfies the following expression: $0.25 < ftgtl3/ftltl3 < 0.8$, where ftgtl3 represents a shortest distance from the object-side surface of the third lens to an image-side surface of the third lens in a direction parallel to the optical axis, and represents a longest distance from the object-side surface of the third lens to the image-side surface of the third lens in the direction parallel to the optical axis.

By appropriately configuring the refractive powers and surface profiles of the first lens, the second lens, the third lens, the fourth lens, and the fifth lens of the optical system, the optical system can have a long focal length and good imaging quality, which can achieve distant-view shooting with high-definition. At the same time, configuring $0.25 < ftgtl3/ftltl3 < 0.8$ can effectively balance an optical path difference of the optical system, correct field curvature, and avoid distortion around the image, such that the imaging effect can more truly reflect the captured object, and the captured image has high image quality, high resolution, and high definition.

In an implementation, the optical system satisfies the following expression: $7 \text{ mm} < FNO*L1SD/\tan FOV < 15 \text{ mm}$, where FNO represents an F-number of the optical system, L1SD represents an aperture of the first lens, and tan FOV represents a tangent value of a maximum angle of view of the optical system. The F-number of the optical system and the aperture of the first lens determine the amount of incident light into the optical system, and a size of the angle of view of the optical system determines the field range of imaging. By properly limiting FNO*L1SD/tan FOV, the optical system can have both enough amount of incident light and an appropriate field range. If $FNO*L1SD/\tan FOV \geq 15 \text{ mm}$, there may be excessive amount of light incident into the optical system, which may degrade the optical performance. If $FNO*L1SD/\tan FOV < 7 \text{ mm}$, it will reduce brightness of the imaging surface, which may reduce the image quality.

In an implementation, the optical system satisfies the following expression: $0.5 < L1SD/Imgh < 0.8$, where L1SD represents an aperture of the first lens, and Imgh represents half of a diagonal length of an effective pixel region of the optical system on an imaging surface. The aperture of the first lens of the optical system determines the amount of incident light into the optical system, and a size of the imaging surface determines definition and a pixel size of the optical system. Only a reasonable configuration of the range of L1SD/Imgh can ensure enough amount of incident light, so as to ensure the definition of the captured image. If $L1SD/Imgh > 0.8$, It will cause excessive exposure and brightness, which will affect the image quality. If $L1SD/Imgh < 0.5$, it will cause insufficient incident light and insufficient relative brightness, which will reduce definition of the image.

In an implementation, the optical system satisfies the following expression: $1 < EFL/f1 < 3$, where EFL represents an effective focal length of the optical system, and f1 represents a focal length of the first lens. A reasonable configuration of the focal length of the first lens and the effective focal length of the optical system is beneficial to optimize the imaging performance of the optical system and reduce sensitivity of the optical system. If $EFL/f1 \leq 1$, it may lead to an increased sensitivity of the optical system and a difficult processing technology, and an aberration produced by the first lens may be more difficult to correct, so that it is difficult to meet the shooting needs. If $EFL/f1 > 3$, the focal length of the first lens is not configured properly with the effective focal length of the optical system, and the aberration caused by the first lens cannot be corrected.

In an implementation, the optical system satisfies the following expression: 0.05<airL2/TTL<0.35, where airL2 represents a distance from an image-side surface of the second lens to the object-side surface of the third lens on the optical axis, and TTL represents a distance from the object-side surface of the first lens to an imaging surface of the optical system on the optical axis. By properly limiting the range of airL2/TTL, it is helpful to reduce the assembly sensitivity of the optical system and improve the production yield. If airL2/TTL>0.35, the system will be too long and cannot meet the requirement on miniaturization design. If airL2/TTL<0.05, it will increase the sensitivity of the optical system, thus reducing the production yield.

In an implementation, the optical system satisfies the following expression: −1<(|R9|−|R10|)(|R9|+|R10|)<0.1, where R9 represents a radius of curvature of the object-side surface of the fifth lens at the optical axis, and R10 represents a radius of curvature of the image-side surface of the fifth lens at the optical axis. By limiting the range of (|R9|−|R10|)/(|R9|+|R10|), the spherical aberration of the optical system can be corrected, the optical path difference of the optical system can be balanced, the field curvature can be corrected, the sensitivity of the system can be reduced, and the assembly stability can be improved. If (|R9|−|R10|)/(|R9|+|R10|)>0.1, the field curvature of the optical system may be too large. If (|R9|−|R10|)/(|R9|+|R10|)<−1, it will increase the system sensitivity and reduce the production yield.

In an implementation, the optical system further include a stop, and the optical system satisfies the following expression: 0.3<DL/TTL<0.6, where DL represents an aperture of the stop of the optical system, and TTL represents a distance from the object-side surface of the first lens to an imaging surface of the optical system on the optical axis. By appropriately limiting the range of DL/TTL, it is beneficial to the miniaturization of the optical system and provides sufficient light for shooting, thus achieving a high-quality and high-definition shooting effect. If DL/TTL>0.6, the aperture for passing light will be too large, and edge light will enter the optical system, which may reduce the image quality. If DL/TTL<0.3, the aperture of the stop will be too small to satisfy the amount of light required by the optical system, so that the requirement on distant-view shooting with high definition cannot be achieved.

In an implementation, the optical system satisfies the following expression: FNO/TTL<0.5 mm$^{-1}$, where FNO represents an F-number of the optical system, and TTL represents a distance from the object-side surface of the first lens to an imaging surface of the optical system on the optical axis. By appropriately limiting the range of FNO/TTL, the miniaturization of the optical system can be achieved, and sufficient incident light can be provided for distant-view shooting, so as to meet the requirement on high-quality and high-definition shooting. If FNO/TTL>0.5 mm$^{-1}$, the incident light into the optical system will be insufficient, thus reducing the definition of the captured image.

In an implementation, the optical system satisfies the following expression: 0.8<TTL/EFL<1, where TTL represents a distance from the object-side surface of the first lens to an imaging surface of the optical system on the optical axis, and EFL represents an effective focal length of the optical system. By limiting the range of TTL/EFL, the focal length of the optical system and the total length of the optical system can be reasonably controlled, which can not only realize the miniaturization of the optical system, but also ensure that the light is better converged on the imaging surface. If TTL/EFL≤0.8, the total length of the optical system is too short, which will increase sensitivity of the optical system and is unfavorable for convergence of light on the imaging surface. If TTL/EFL≥1, the total length of the optical system is too long, so that an incident angle of the chief ray on the imaging surface will be too large, and the edge rays cannot be incident on the imaging surface, resulting in incomplete imaging information.

In an implementation, the optical system satisfies the following expression: 1.5<EFL/Imgh<2, where EFL represents an effective focal length of the optical system, and Imgh represents half of a diagonal length of an effective pixel region of the optical system on an imaging surface. By limiting the range of EFL/Imgh, the focal length and an image height of the optical system can be reasonably controlled, which can not only achieve distant-view shooting with high definition, but also ensure that the light is better converged on the imaging surface. If EFL/Imgh<1.5, the focal length will be reduced under the condition that the image height remains unchanged, which cannot meet the requirement on distant-view shooting. If EFL/Imgh≥2, it cannot be guaranteed that the light will converge on the imaging surface.

By limiting the above parameters, the optical system can have good image quality. In an example, ftgtl3/ftltl3 may be equal to 0.52, 0.58, 0.47, etc. FNO*L1SD/tan FOV may be equal to 12.84 mm, 12.91 mm, 12.86 mm, etc. L1SD/Imgh may be equal to 0.75, 0.73, 0.70, etc. EFL/f1 may be equal to 2.29, 2.27, 2.43, etc. airL2/TTL may be equal to 0.24, 0.32, 0.25, etc.

The optical system has lenses with aspheric surfaces, which is beneficial to correct aberration and improve image quality of the optical system. The equation of an aspheric surface includes but is not limited to the following equation:

$$Z = \frac{cr^2}{1 + \sqrt{1 - (k+1)c^2 r^2}} + \sum_i A_i r^i$$

Where Z represents a distance from a respective point on the aspheric surface to a tangential plane at the surface vertex, r represents a distance from a respective point on the aspheric surface to the optical axis, c represents a curvature of the aspheric surface vertex, k represents a conic constant, and Ai represents a coefficient corresponding to order i in the equation of the aspheric surface.

Hereinafter, the disclosure will be described in detail through seven specific embodiments.

Figure 2:
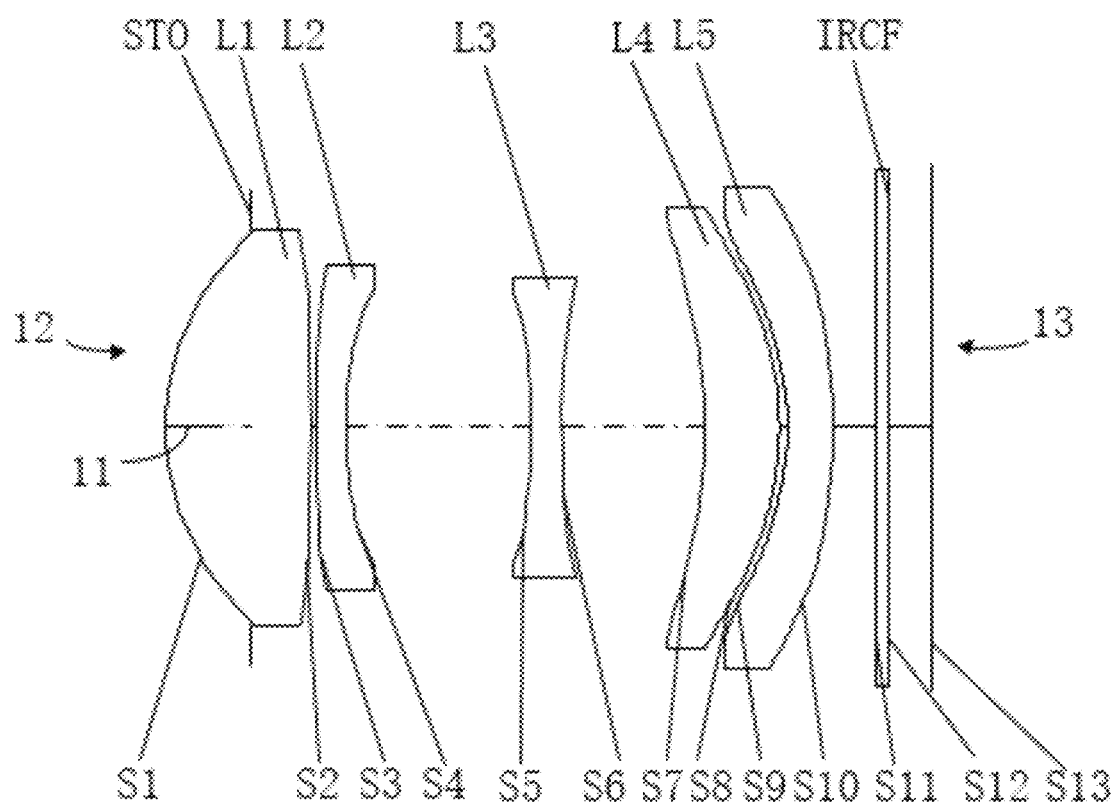
FIG. 2 is a schematic structural diagram illustrating an optical system according to an embodiment of the disclosure.

As shown in FIG. 2, a straight line 11 represents an optical axis, an object side is a side of a first lens L1 away from a second lens L2, and an image side 13 is a side of a fifth lens L5 away from a fourth lens L4. In an optical system according to this embodiment, there are a stop STO, a first lens L1, a second lens L2, a third lens L3, a fourth lens L4, a fifth lens L5, and an infrared filter IRCF.

The first lens L1 has a positive refractive power and is made of plastic. The first lens L1 has an object-side surface S1 which is convex both at the optical axis and at the circumference and an image-side surface S2 which is convex both at the optical axis and at the circumference. The object-side surface S1 and the image-side surface S2 are both aspheric surfaces.

The second lens L2 has a negative refractive power and is made of plastic. The second lens L2 has an object-side surface S3 which is convex both at the optical axis and at the circumference and an image-side surface S4 which is concave both at the optical axis and at the circumference. The object-side surface S3 and the image-side surface S4 are both aspheric surfaces.

The third lens L3 has a negative refractive power and is made of plastic. The third lens L3 has an object-side surface S5 which is concave both at the optical axis and at the circumference and an image-side surface S6 which is concave both at the optical axis and at the circumference. The object-side surface S5 and the image-side surface S6 are both aspheric surfaces.

The fourth lens L4 has a positive refractive power and is made of plastic. The fourth lens L4 has an object-side surface S7 which is concave both at the optical axis and at the circumference and an image-side surface S8 which is convex both at the optical axis and at the circumference. The object-side surface S7 and the image-side surface S8 are both aspheric surfaces.

The fifth lens L5 has a negative refractive power and is made of plastic. The fifth lens L5 has an object-side surface S9 which is concave at the optical axis and convex at the circumference and an image-side surface S10 which is convex both at the optical axis and at the circumference. The object-side surface S9 and the image-side surface S10 are both aspheric surfaces.

The stop STO may be arranged between the object side of the optical system and the fifth lens. The stop STO in this embodiment is arranged at a side of the first lens L1 away from the second lens L2 and configured to control the amount of incident light.

In a direction from the object side to the image side, the infrared filter IRCF is arranged after the fifth lens L5. The infrared filter IRCF includes an object-side surface S11 and an image-side surface S12. The infrared filter IRCF is used to filter out infrared light, such that light incident to an imaging surface is visible light. The visible light has a wavelength ranged from 380 nm-780 nm. The infrared filter IRCF is made of glass.

The imaging surface S13 is a surface where an image is formed by light of the captured object passing through the optical system.

Table 1a shows characteristics of the optical system of the embodiment, where the radius of curvature in this embodiment is radius of curvature of respective lens at the optical axis.

TABLE 1a

Optical system of FIG. 2
EFL = 7.45 mm, FNO = 2.44, FOV = 30.30°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | Spheric | Infinity | Infinity | | | | |
| STO | Stop | Aspheric | Infinity | −0.723 | | | | |
| S1 | First lens | Aspheric | 1.839 | 1.215 | plastic | 1.54 | 56.11 | 3.26 |
| S2 | | Aspheric | −42.581 | 0.050 | | | | |
| S3 | Second lens | Aspheric | 10.971 | 0.242 | plastic | 1.66 | 20.38 | −6.39 |
| S4 | | Aspheric | 3.041 | 1.549 | | | | |
| S5 | Third lens | Aspheric | −5.647 | 0.264 | plastic | 1.54 | 56.11 | −7.55 |
| S6 | | Aspheric | 15.531 | 1.196 | | | | |
| S7 | Fourth lens | Aspheric | −3.896 | 0.620 | plastic | 1.66 | 20.38 | 6.49 |
| S8 | | Aspheric | −2.180 | 0.071 | | | | |
| S9 | Fifth lens | Aspheric | −1.544 | 0.384 | plastic | 1.54 | 56.11 | −7.40 |
| S10 | | Aspheric | −2.717 | 0.355 | | | | |
| S11 | Infrared filter | Spheric | Infinity | 0.110 | glass | | | |
| S12 | | Spheric | Infinity | 0.345 | | | | |
| S13 | Image surface | Spheric | Infinity | 0.000 | | | | |

Note:
a reference wavelength is 555 nm

In this table, EFL represents an effective focal length of the optical system, FNO represents an F-number of the optical system, FOV represents an angle of view in a diagonal direction of the optical system, TTL represents a distance from the object-side surface of the first lens to the imaging surface of the optical system on the optical axis.

Table 1b shows high order coefficients A4, A6, A8, A10, A12, A14, A16, A18, and A20 which can be used for respective aspheric surfaces S1, S2, S3, S4, S5, S6, S7, S8, S9, S10 in this embodiment.

TABLE 1b

| Surface number | K | A4 | A6 | A8 | A10 |
|---|---|---|---|---|---|
| S1 | −1.832E+00 | 3.487E−02 | −9.900E−03 | 3.075E−02 | −5.322E−02 |
| S2 | 1.700E+00 | −1.524E−01 | 4.125E−01 | −5.156E−01 | 3.029E−01 |
| S3 | −8.333E+00 | −1.752E−01 | 4.285E−01 | −3.103E−01 | −3.492E−01 |
| S4 | −3.176E+00 | −2.762E−01 | 1.335E−02 | −3.617E−02 | −1.321E−01 |
| S5 | 1.700E+00 | 6.510E−03 | −1.392E−01 | 7.190E−01 | −2.324E+00 |
| S6 | −6.890E+01 | 6.766E−02 | −1.346E−01 | 6.933E−01 | −1.927E+00 |
| S7 | −3.247E+00 | −4.579E−02 | 6.882E−02 | −5.229E−02 | 1.757E−02 |
| S8 | −1.864E+00 | 2.071E−02 | 3.011E−02 | −1.352E−01 | 1.542E−01 |
| S9 | −2.026E+00 | 2.419E−01 | −2.527E−01 | 1.145E−02 | 1.493E−01 |

TABLE 1b-continued

| S10 | −1.698E+00 | 1.738E−01 | −1.950E−01 | 4.966E−02 | 6.214E−02 |
|---|---|---|---|---|---|

| Surface number | A12 | A14 | A16 | A18 | A20 |
|---|---|---|---|---|---|
| S1 | 5.638E−02 | −3.661E−02 | 1.412E−02 | −2.960E−03 | 2.500E−04 |
| S2 | 4.750E−03 | −1.264E−01 | 8.044E−02 | −2.201E−02 | 2.330E−03 |
| S3 | 9.765E−01 | −9.441E−01 | 4.765E−01 | −1.247E−01 | 1.334E−02 |
| S4 | −3.469E−02 | 5.911E−01 | −8.190E−01 | 4.669E−01 | −9.936E−02 |
| S5 | 4.460E+00 | −5.272E+00 | 3.687E+00 | −1.374E+00 | 2.041E−01 |
| S6 | 3.211E+00 | −3.315E+00 | 2.056E+00 | −6.973E−01 | 9.884E−02 |
| S7 | −7.660E−03 | 1.484E−02 | −1.152E−02 | 3.590E−03 | −4.000E−04 |
| S8 | −1.096E−01 | 5.712E−02 | −1.974E−02 | 3.790E−03 | −3.000E−04 |
| S9 | −1.264E−01 | 5.343E−02 | −1.308E−02 | 1.780E−03 | −1.000E−04 |
| S10 | −6.310E−02 | 2.644E−02 | −5.960E−03 | 7.100E−04 | −4.000E−05 |

Figure 3:
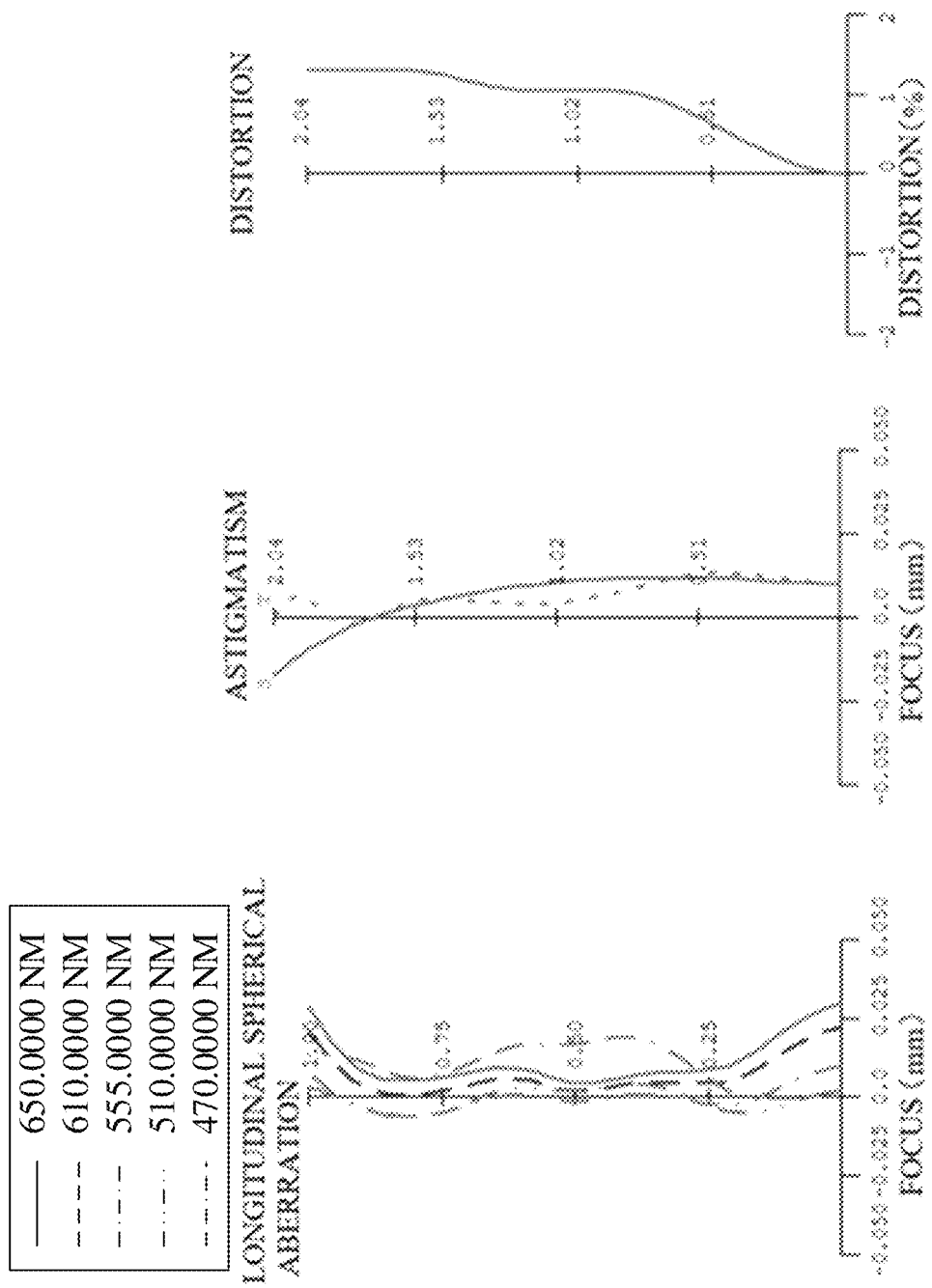
FIG. 3 illustrates the longitudinal spherical aberration curve, the astigmatic curve, and the distortion curve of the optical system of FIG. 2.

FIG. 3 illustrates the longitudinal spherical aberration curve, the astigmatic curve, and the distortion curve of the optical system of FIG. 2. The longitudinal spherical aberration curve represents focus deviation of lights of different wavelengths after passing through lenses in the optical system. The astigmatic curve represents sagittal field curvature and tangential field curvature. The distortion curve represents distortion values corresponding to different angles of view. As can be seen from FIG. 3, the optical system of this embodiment can achieve good image quality.

Figure 4:
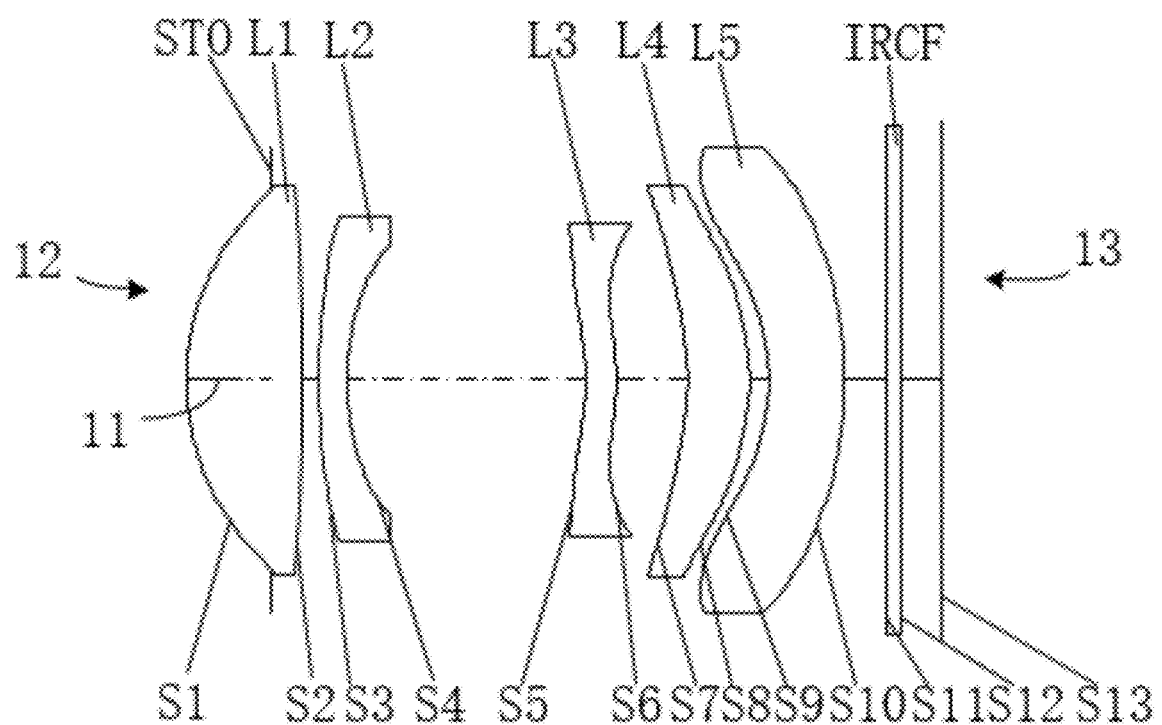
FIG. 4 is a schematic structural diagram illustrating an optical system according to an embodiment of the disclosure.

As shown in FIG. 4, a straight line 11 represents an optical axis, an object side is a side of a first lens L1 away from a second lens L2, and an image side 13 is a side of a fifth lens L5 away from a fourth lens L4. In an optical system according to this embodiment, there are a stop STO, a first lens L1, a second lens L2, a third lens L3, a fourth lens L4, a fifth lens L5, and an infrared filter IRCF.

The first lens L1 has a positive refractive power and is made of plastic. The first lens L1 has an object-side surface S1 which is convex both at the optical axis and at the circumference and an image-side surface S2 which is convex both at the optical axis and at the circumference. The object-side surface S1 and the image-side surface S2 are both aspheric surfaces.

The second lens L2 has a negative refractive power and is made of plastic. The second lens L2 has an object-side surface S3 which is convex both at the optical axis and at the circumference and an image-side surface S4 which is concave both at the optical axis and at the circumference. The object-side surface S3 and the image-side surface S4 are both aspheric surfaces.

The third lens L3 has a positive refractive power and is made of plastic. The third lens L3 has an object-side surface S5 which is concave both at the optical axis and at the circumference and an image-side surface S6 which is convex at the optical axis and concave at the circumference. The object-side surface S5 and the image-side surface S6 are both aspheric surfaces.

The fourth lens L4 has a positive refractive power and is made of plastic. The fourth lens L4 has an object-side surface S7 which is concave both at the optical axis and at the circumference and an image-side surface S8 which is convex both at the optical axis and at the circumference. The object-side surface S7 and the image-side surface S8 are both aspheric surfaces.

The fifth lens L5 has a negative refractive power and is made of plastic. The fifth lens L5 has an object-side surface S9 which is concave at the optical axis and convex at the circumference and an image-side surface S10 which is convex both at the optical axis and at the circumference. The object-side surface S9 and the image-side surface S10 are both aspheric surfaces.

The stop STO may be arranged between the object side of the optical system and the fifth lens. The stop STO in this embodiment is arranged at a side of the first lens L1 away from the second lens L2 and configured to control the amount of incident light.

In a direction from the object side to the image side, the infrared filter IRCF is arranged after the fifth lens L5. The infrared filter IRCF includes an object-side surface S11 and an image-side surface S12. The infrared filter IRCF is used to filter out infrared light, such that light incident to an imaging surface is visible light. The visible light has a wavelength ranged from 380 nm-780 nm. The infrared filter IRCF is made of glass.

The imaging surface S13 is a surface where an image is formed by light of the captured object passing through the optical system.

Table 2a shows characteristics of the optical system of the embodiment, where the radius of curvature in this embodiment is radius of curvature of respective lens at the optical axis.

TABLE 2a

Optical system of FIG. 4
EFL = 7.48 mm, FNO = 2.44, FOV = 30.30°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | Spheric | Infinity | Infinity | | | | |
| STO | Stop | Aspheric | Infinity | −0.723 | | | | |
| S1 | First | Aspheric | 1.822 | 0.984 | plastic | 1.54 | 56.11 | 3.30 |
| S2 | lens | Aspheric | −115.688 | 0.137 | | | | |
| S3 | Second | Aspheric | 3.556 | 0.240 | plastic | 1.66 | 20.38 | −5.65 |
| S4 | lens | Aspheric | 1.779 | 2.024 | | | | |

TABLE 2a-continued

Optical system of FIG. 4
EFL = 7.48 mm, FNO = 2.44, FOV = 30.30°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| S5 | Third | Aspheric | −1.712 | 0.260 | plastic | 1.54 | 56.11 | 5575.48 |
| S6 | lens | Aspheric | −1.803 | 0.605 | | | | |
| S7 | Fourth | Aspheric | −1.757 | 0.527 | plastic | 1.66 | 20.38 | 5.51 |
| S8 | lens | Aspheric | −1.331 | 0.164 | | | | |
| S9 | Fifth | Aspheric | −1.160 | 0.639 | plastic | 1.54 | 56.11 | −4.07 |
| S10 | lens | Aspheric | −2.904 | 0.365 | | | | |
| S11 | Infrared | Spheric | Infinity | 0.110 | glass | | | |
| S12 | filter | Spheric | Infinity | 0.345 | | | | |
| S13 | Image surface | Spheric | Infinity | | | | | |

Note:
a reference wavelength is 555 nm

In this table, EFL represents an effective focal length of the optical system, FNO represents an F-number of the optical system, FOV represents an angle of view in a diagonal direction of the optical system, TTL represents a distance from the object-side surface of the first lens to the imaging surface of the optical system on the optical axis.

Table 2b shows high order coefficients A4, A6, A8, A10, A12, A14, A16, A18, and A20 which can be used for respective aspheric surfaces S1, S2, S3, S4, S5, S6, S7, S8, S9, S10 in this embodiment.

TABLE 2b

| Surface number | K | A4 | A6 | A8 | A10 |
|---|---|---|---|---|---|
| S1 | −1.757E+00 | 3.289E−02 | −1.390E−03 | 5.200E−04 | 9.950E−03 |
| S2 | 4.958E+01 | −8.830E−02 | 1.962E−01 | −2.367E−01 | 1.942E−01 |
| S3 | −2.094E+01 | −1.338E−01 | 3.086E−01 | −3.060E−01 | 1.515E−01 |
| S4 | −2.631E+00 | −6.285E−01 | 2.463E−01 | −2.784E−01 | 3.201E−01 |
| S5 | −2.424E+01 | −2.500E−01 | 1.509E+00 | −4.157E+00 | 7.618E+00 |
| S6 | −2.464E+01 | −6.927E−02 | 1.092E+00 | −2.640E+00 | 4.017E+00 |
| S7 | −1.556E+01 | 9.229E−02 | −3.215E−01 | 6.382E−01 | −9.447E−01 |
| S8 | −4.220E+00 | 4.821E−01 | −1.424E+00 | 2.144E+00 | −2.091E+00 |
| S9 | −1.889E+00 | 6.154E−01 | −1.822E+00 | 2.723E+00 | −2.458E+00 |
| S10 | −6.100E−01 | 3.557E−02 | −9.998E−02 | 6.779E−02 | 3.331E−02 |

| Surface number | A12 | A14 | A16 | A18 | A20 |
|---|---|---|---|---|---|
| S1 | −1.949E−02 | 1.862E−02 | −9.970E−03 | 2.850E−03 | −3.400E−04 |
| S2 | −1.163E−01 | 5.004E−02 | −1.443E−02 | 2.450E−03 | −1.900E−04 |
| S3 | −3.769E−02 | 2.209E−02 | −2.281E−02 | 1.016E−02 | −1.570E−03 |
| S4 | −4.175E−01 | 3.815E−01 | −1.299E−01 | −3.522E−02 | 2.604E−02 |
| S5 | −9.462E+00 | 7.743E+00 | −4.006E+00 | 1.197E+00 | −1.590E−01 |
| S6 | −3.935E+00 | 2.392E+00 | −8.588E−01 | 1.687E−01 | −1.504E−02 |
| S7 | 9.440E−01 | −5.830E−01 | 2.094E−01 | −3.964E−02 | 3.020E−03 |
| S8 | 1.358E+00 | −5.723E−01 | 1.486E−01 | −2.141E−02 | 1.300E−03 |
| S9 | 1.428E+00 | −5.373E−01 | 1.268E−01 | −1.709E−02 | 1.000E−03 |
| S10 | −7.047E−02 | 4.176E−02 | −1.246E−02 | 1.910E−03 | −1.200E−04 |

Figure 5:
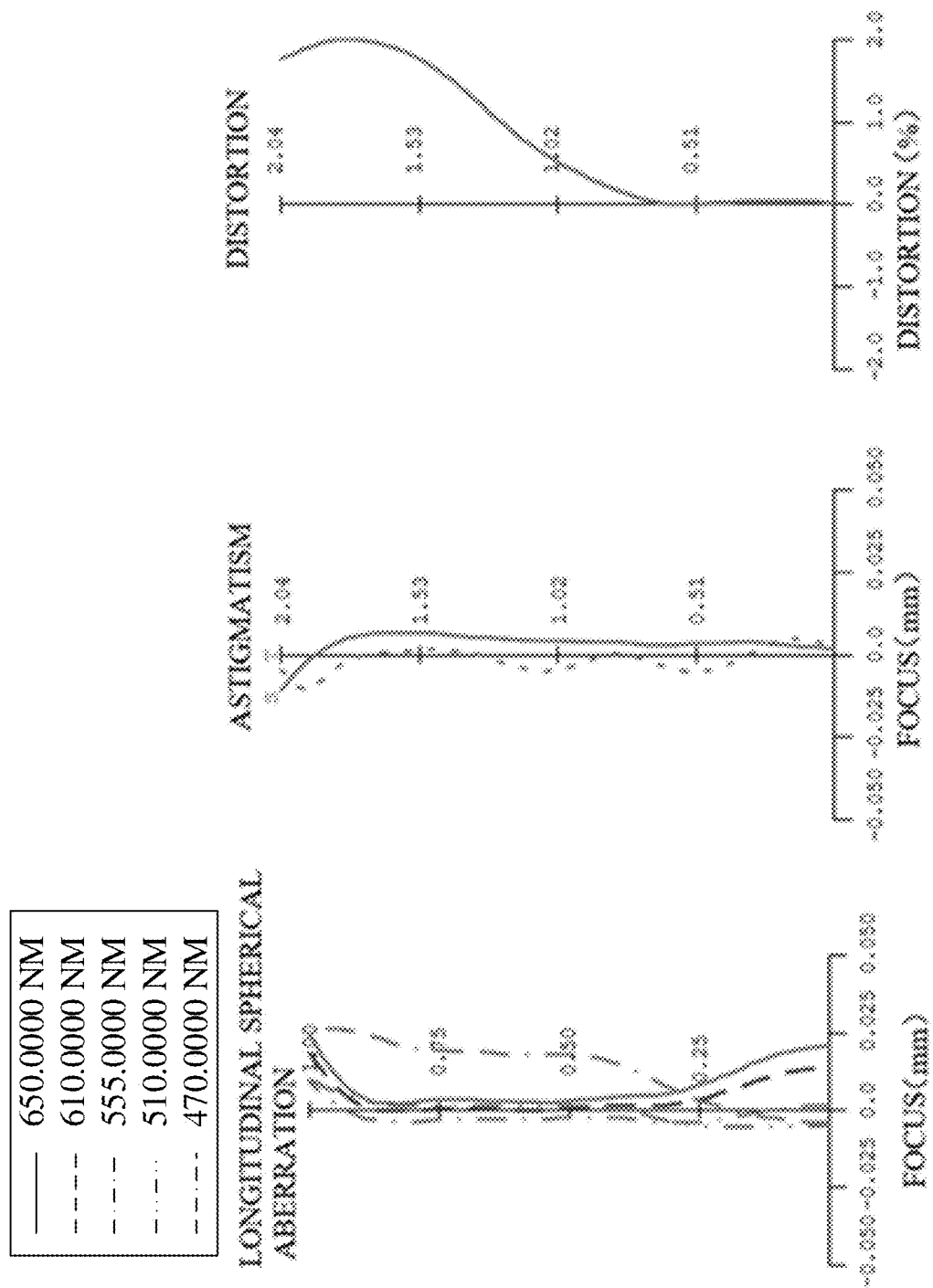
FIG. 5 illustrates the longitudinal spherical aberration curve, the astigmatic curve, and the distortion curve of the optical system of FIG. 4.

FIG. 5 illustrates the longitudinal spherical aberration curve, the astigmatic curve, and the distortion curve of the optical system of FIG. 4. The longitudinal spherical aberration curve represents focus deviation of lights of different wavelengths after passing through lenses in the optical system. The astigmatic curve represents sagittal field curvature and tangential field curvature. The distortion curve represents distortion values corresponding to different angles of view. As can be seen from FIG. 5, the optical system of this embodiment can achieve a good image quality.

Figure 6:
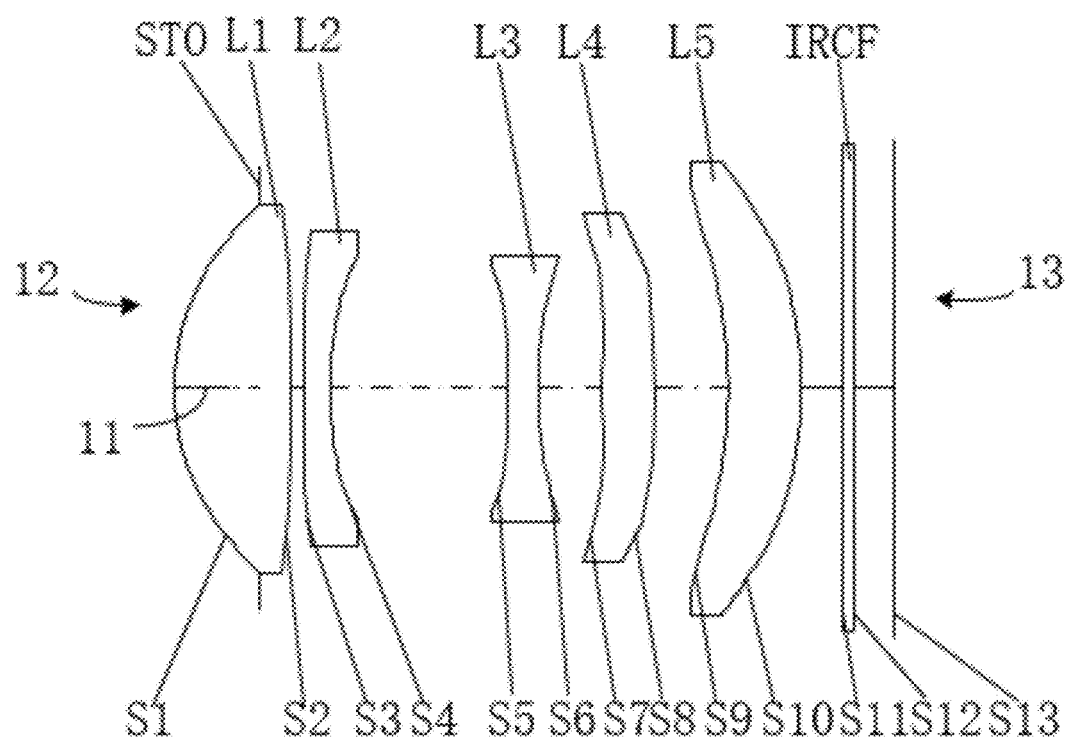
FIG. 6 is a schematic structural diagram illustrating an optical system according to an embodiment of the disclosure.

As shown in FIG. 6, a straight line 11 represents an optical axis, an object side is a side of a first lens L1 away from a second lens L2, and an image side 13 is a side of a fifth lens L5 away from a fourth lens L4. In an optical system according to this embodiment, there are a stop STO, a first lens L1, a second lens L2, a third lens L3, a fourth lens L4, a fifth lens L5, and an infrared filter IRCF.

The first lens L1 has a positive refractive power and is made of plastic. The first lens L1 has an object-side surface S1 which is convex both at the optical axis and at the circumference and an image-side surface S2 which is convex both at the optical axis and at the circumference. The object-side surface S1 and the image-side surface S2 are both aspheric surfaces.

The second lens L2 has a negative refractive power and is made of plastic. The second lens L2 has an object-side surface S3 which is convex both at the optical axis and at the circumference and an image-side surface S4 which is concave both at the optical axis and at the circumference. The object-side surface S3 and the image-side surface S4 are both aspheric surfaces.

The third lens L3 has a negative refractive power and is made of plastic. The third lens L3 has an object-side surface S5 which is concave both at the optical axis and at the circumference and an image-side surface S6 which is concave both at the optical axis and at the circumference. The object-side surface S5 and the image-side surface S6 are both aspheric surfaces.

The fourth lens L4 has a positive refractive power and is made of plastic. The fourth lens L4 has an object-side surface S7 which is convex at the optical axis and concave at the circumference and an image-side surface S8 which is convex both at the optical axis and at the circumference. The object-side surface S7 and the image-side surface S8 are both aspheric surfaces.

The fifth lens L5 has a positive refractive power and is made of plastic. The fifth lens L5 has an object-side surface S9 which is concave at the optical axis and convex at the circumference and an image-side surface S10 which is convex both at the optical axis and at the circumference. The object-side surface S9 and the image-side surface S10 are both aspheric surfaces.

The stop STO may be arranged between the object side of the optical system and the fifth lens. The stop STO in this embodiment is arranged at a side of the first lens L1 away from the second lens L2 and configured to control the amount of incident light.

In a direction from the object side to the image side, the infrared filter IRCF is arranged after the fifth lens L5. The infrared filter IRCF includes an object-side surface S11 and an image-side surface S12. The infrared filter IRCF is used to filter out infrared light, such that light incident to an imaging surface is visible light. The visible light has a wavelength ranged from 380 nm-780 nm. The infrared filter IRCF is made of glass.

The imaging surface S13 is a surface where an image is formed by light of the captured object passing through the optical system.

Table 3a shows characteristics of the optical system of the embodiment, where the radius of curvature in this embodiment is radius of curvature of respective lens at the optical axis.

TABLE 3a

Optical system of FIG. 6
EFL = 7.49 mm, FNO = 2.46, FOV = 30.19°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | Spheric | Infinity | Infinity | | | | |
| STO | Stop | Aspheric | Infinity | −0.750 | | | | |
| S1 | First | Aspheric | 1.780 | 1.044 | plastic | 1.54 | 56.11 | 3.08 |
| S2 | lens | Aspheric | −24.116 | 0.102 | | | | |
| S3 | Second | Aspheric | 13.560 | 0.241 | plastic | 1.66 | 20.38 | −5.91 |
| S4 | lens | Aspheric | 3.032 | 1.590 | | | | |
| S5 | Third | Aspheric | −7.066 | 0.261 | plastic | 1.54 | 56.11 | −3.97 |
| S6 | lens | Aspheric | 3.171 | 0.570 | | | | |
| S7 | Fourth | Aspheric | 9.979 | 0.464 | plastic | 1.66 | 20.38 | 11.97 |
| S8 | lens | Aspheric | −39.074 | 0.657 | | | | |
| S9 | Fifth | Aspheric | −3.237 | 0.652 | plastic | 1.54 | 56.11 | 32.73 |
| S10 | lens | Aspheric | −2.936 | 0.365 | | | | |
| S11 | Infrared | Spheric | Infinity | 0.110 | glass | | | |
| S12 | filter | Spheric | Infinity | 0.345 | | | | |
| S13 | Image surface | Spheric | Infinity | 0.000 | | | | |

Note:
a reference wavelength is 555 nm

In this table, EFL represents an effective focal length of the optical system, FNO represents an F-number of the optical system, FOV represents an angle of view in a diagonal direction of the optical system, TTL represents a distance from the object-side surface of the first lens to the imaging surface of the optical system on the optical axis.

Table 3b shows high order coefficients A4, A6, A8, A10, A12, A14, A16, A18, and A20 which can be used for respective aspheric surfaces S1, S2, S3, S4, S5, S6, S7, S8, S9, S10 in this embodiment.

TABLE 3b

| Surface number | K | A4 | A6 | A8 | A10 |
|---|---|---|---|---|---|
| S1 | −1.698E+00 | 3.391E−02 | −5.500E−04 | 5.260E−03 | −6.630E−03 |
| S2 | −9.703E+01 | −9.938E−02 | 2.625E−01 | −4.028E−01 | 4.254E−01 |
| S3 | −2.448E+01 | −1.503E−01 | 4.271E−01 | −6.716E−01 | 7.275E−01 |
| S4 | −2.977E+00 | −4.358E−02 | 2.542E−01 | −5.028E−01 | 9.245E−01 |
| S5 | 3.488E+01 | −6.920E−02 | 3.791E−02 | 2.522E−01 | −1.291E+00 |
| S6 | −2.466E+01 | 3.580E−02 | −1.971E−02 | 1.832E−01 | −4.926E−01 |
| S7 | −9.500E+01 | −3.794E−02 | −1.725E−01 | 4.420E−01 | −7.850E−01 |
| S8 | 5.550E+01 | −1.017E−02 | −1.946E−01 | 3.857E−01 | −5.255E−01 |
| S9 | −3.770E−01 | 9.687E−02 | −2.298E−01 | 3.387E−01 | −3.138E−01 |
| S10 | −1.802E−01 | 6.085E−02 | −1.541E−01 | 1.824E−01 | −1.311E−01 |

| Surface number | A12 | A14 | A16 | A18 | A20 |
|---|---|---|---|---|---|
| S1 | 4.680E−03 | −1.390E−03 | −2.800E−04 | 2.900E−04 | −6.000E−05 |
| S2 | −3.160E−01 | 1.616E−01 | −5.406E−02 | 1.061E−02 | −9.300E−04 |
| S3 | −5.529E−01 | 2.949E−01 | −1.063E−01 | 2.343E−02 | −2.370E−03 |
| S4 | −1.458E+00 | 1.720E+00 | −1.312E+00 | 5.635E−01 | −1.027E−01 |
| S5 | 3.045E+00 | −4.286E+00 | 3.581E+00 | −1.630E+00 | 3.089E−01 |
| S6 | 7.635E−01 | −7.464E−01 | 4.504E−01 | −1.529E−01 | 2.216E−02 |
| S7 | 9.121E−01 | −6.942E−01 | 3.393E−01 | −9.532E−02 | 1.150E−02 |
| S8 | 4.673E−01 | −2.690E−01 | 9.751E−02 | −1.996E−02 | 1.730E−03 |
| S9 | 1.796E−01 | −6.250E−02 | 1.285E−02 | −1.430E−03 | 7.000E−05 |
| S10 | 5.862E−02 | −1.626E−02 | 2.670E−03 | −2.200E−04 | 1.000E−05 |

Figure 7:
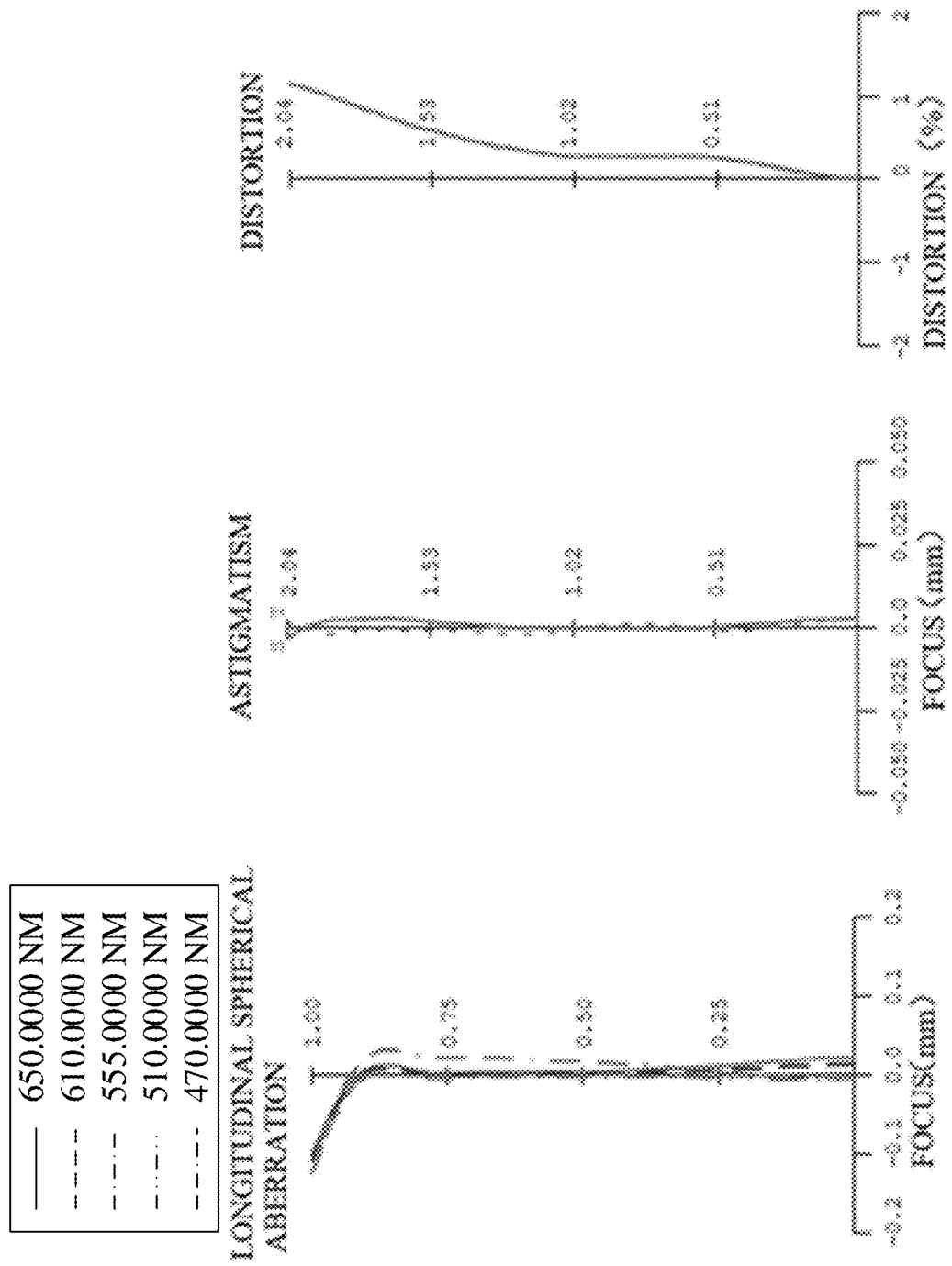
FIG. 7 illustrates the longitudinal spherical aberration curve, the astigmatic curve, and the distortion curve of the optical system of FIG. 6.

FIG. 7 illustrates the longitudinal spherical aberration curve, the astigmatic curve, and the distortion curve of the optical system of FIG. 6. The longitudinal spherical aberration curve represents focus deviation of lights of different wavelengths after passing through lenses in the optical system. The astigmatic curve represents sagittal field curvature and tangential field curvature. The distortion curve represents distortion values corresponding to different angles of view. As can be seen from FIG. 7, the optical system of this embodiment can achieve a good image quality.

Figure 8:
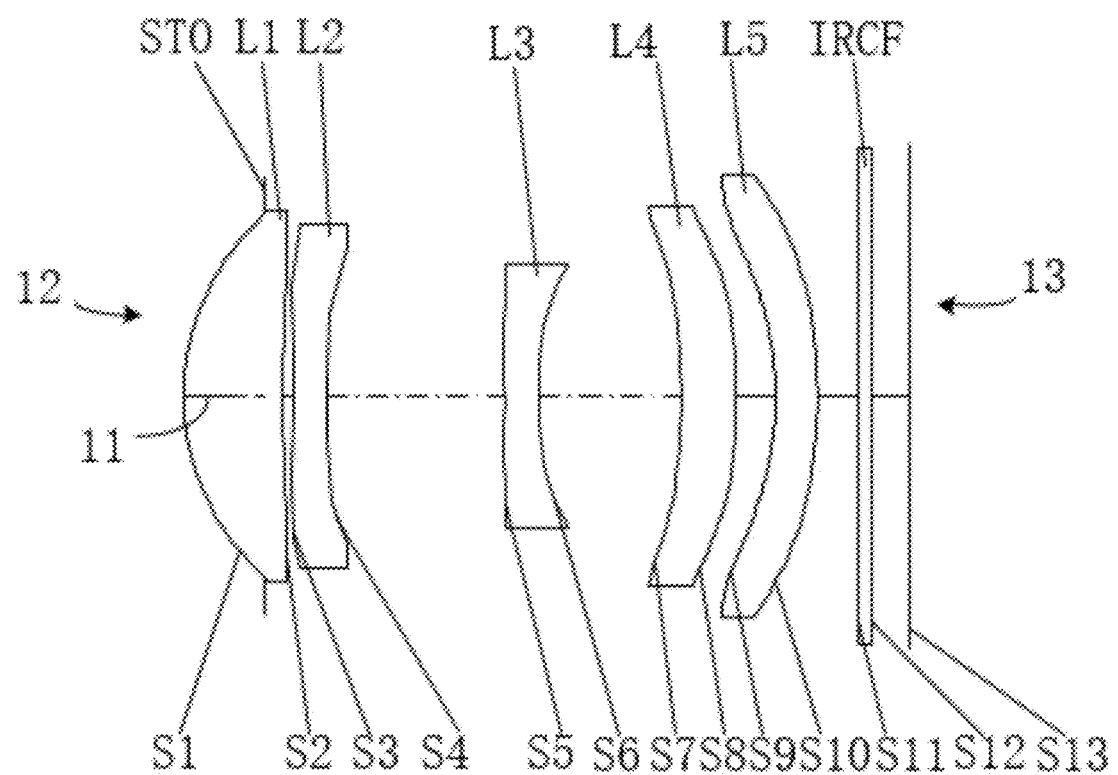
FIG. 8 is a schematic structural diagram illustrating an optical system according to an embodiment of the disclosure.

As shown in FIG. 8, a straight line 11 represents an optical axis, an object side is a side of a first lens L1 away from a second lens L2, and an image side 13 is a side of a fifth lens L5 away from a fourth lens L4. In an optical system according to this embodiment, there are a stop STO, a first lens L1, a second lens L2, a third lens L3, a fourth lens L4, a fifth lens L5, and an infrared filter IRCF.

The first lens L1 has a positive refractive power and is made of plastic. The first lens L1 has an object-side surface S1 which is convex both at the optical axis and at the circumference and an image-side surface S2 which is concave at the optical axis and convex at the circumference. The object-side surface S1 and the image-side surface S2 are both aspheric surfaces.

The second lens L2 has a positive refractive power and is made of plastic. The second lens L2 has an object-side surface S3 which is convex both at the optical axis and at the circumference and an image-side surface S4 which is convex at the optical axis and concave at the circumference. The object-side surface S3 and the image-side surface S4 are both aspheric surfaces.

The third lens L3 has a negative refractive power and is made of plastic. The third lens L3 has an object-side surface S5 which is concave both at the optical axis and at the circumference and an image-side surface S6 which is concave both at the optical axis and at the circumference. The object-side surface S5 and the image-side surface S6 are both aspheric surfaces.

The fourth lens L4 has a positive refractive power and is made of plastic. The fourth lens L4 has an object-side surface S7 which is concave both at the optical axis and at the circumference and an image-side surface S8 which is convex both at the optical axis and at the circumference. The object-side surface S7 and the image-side surface S8 are both aspheric surfaces.

The fifth lens L5 has a negative refractive power and is made of plastic. The fifth lens L5 has an object-side surface S9 which is concave both at the optical axis and at the circumference and an image-side surface S10 which is convex both at the optical axis and at the circumference. The object-side surface S9 and the image-side surface S10 are both aspheric surfaces.

The stop STO may be arranged between the object side of the optical system and the fifth lens. The stop STO in this embodiment is arranged at a side of the first lens L1 away from the second lens L2 and configured to control the amount of incident light.

In a direction from the object side to the image side, the infrared filter IRCF is arranged after the fifth lens L5. The infrared filter IRCF includes an object-side surface S11 and an image-side surface S12. The infrared filter IRCF is used to filter out infrared light, such that light incident to an imaging surface is visible light. The visible light has a wavelength ranged from 380 nm-780 nm. The infrared filter IRCF is made of glass.

The imaging surface S13 is a surface where an image is formed by light of the captured object passing through the optical system.

Table 4a shows characteristics of the optical system of the embodiment, where the radius of curvature in this embodiment is radius of curvature of respective lens at the optical axis TABLE 4a Optical system of FIG. 8
EFL = 7.48 mm, FNO = 2.51, FOV = 30.53°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | Spheric | Infinity | Infinity | | | | |
| STO | Stop | Aspheric | Infinity | −0.705 | | | | |
| S1 | First | Aspheric | 1.793 | 0.867 | plastic | 1.54 | 56.11 | 5.08 |
| S2 | lens | Aspheric | 4.205 | 0.100 | | | | |
| S3 | Second | Aspheric | 1270.618 | 0.305 | plastic | 1.66 | 20.38 | 47.69 |
| S4 | lens | Aspheric | −32.600 | 1.553 | | | | |
| S5 | Third | Aspheric | −7.213 | 0.301 | plastic | 1.54 | 56.11 | −6.56 |
| S6 | lens | Aspheric | 7.208 | 1.255 | | | | |
| S7 | Fourth | Aspheric | −4.696 | 0.490 | plastic | 1.66 | 20.38 | 14.70 |
| S8 | lens | Aspheric | −3.307 | 0.344 | | | | |
| S9 | Fifth | Aspheric | −1.941 | 0.364 | plastic | 1.54 | 56.11 | −8.50 |
| S10 | lens | Aspheric | −3.558 | 0.365 | | | | |
| S11 | Infrared | Spheric | Infinity | 0.110 | glass | | | |
| S12 | filter | Spheric | Infinity | 0.345 | | | | |
| S13 | Image surface | Spheric | Infinity | 0.000 | | | | |

Note:
a reference wavelength is 555 nm

In this table, EFL represents an effective focal length of the optical system, FNO represents an F-number of the optical system, FOV represents an angle of view in a diagonal direction of the optical system, TTL represents a distance from the object-side surface of the first lens to the imaging surface of the optical system on the optical axis.

Table 4b shows high order coefficients A4, A6, A8, A10, A12, A14, A16, A18, and A20 which can be used for respective aspheric surfaces S1, S2, S3, S4, S5, S6, S7, S8, S9, S10 in this embodiment.

TABLE 4b

| Surface number | K | A4 | A6 | A8 | A10 |
|---|---|---|---|---|---|
| S1 | −1.702E+00 | 2.781E−02 | −1.260E−03 | 4.796E−02 | −1.119E−01 |
| S2 | −8.412E+01 | −1.168E−01 | 8.764E−02 | 3.123E−01 | −8.534E−01 |
| S3 | −9.900E+01 | −2.469E−01 | 5.368E−01 | −3.684E−01 | −2.338E−01 |
| S4 | 3.660E+01 | −2.261E−02 | 2.823E−01 | −3.144E−01 | 1.658E−01 |
| S5 | −9.085E+01 | 1.717E−01 | −5.063E−02 | −4.839E−01 | 1.888E+00 |
| S6 | 3.757E+01 | 2.226E−01 | 7.084E−02 | −1.097E+00 | 3.820E+00 |
| S7 | 1.010E+00 | 2.791E−02 | −1.437E−02 | −1.549E−01 | 3.920E−01 |
| S8 | −2.561E+00 | 8.999E−02 | −1.908E−01 | 1.572E−01 | −6.744E−02 |
| S9 | −1.339E+00 | 2.359E−01 | −4.815E−01 | 4.882E−01 | −2.548E−01 |
| S10 | 4.264E−01 | 9.684E−02 | −1.981E−01 | 1.425E−01 | −1.206E−02 |

| Surface number | A12 | A14 | A16 | A18 | A20 |
|---|---|---|---|---|---|
| S1 | 1.395E−01 | −1.031E−01 | 4.497E−02 | −1.068E−02 | 1.050E−03 |
| S2 | 9.842E−01 | −6.416E−01 | 2.456E−01 | −5.171E−02 | 4.650E−03 |
| S3 | 6.724E−01 | −5.872E−01 | 2.685E−01 | −6.485E−02 | 6.570E−03 |
| S4 | −7.549E−02 | 1.716E−01 | −2.154E−01 | 1.137E−01 | −2.192E−02 |
| S5 | −4.100E+00 | 5.311E+00 | −4.038E+00 | 1.656E+00 | −2.822E−01 |
| S6 | −8.027E+00 | 1.036E+01 | −7.982E+00 | 3.364E+00 | −5.961E−01 |
| S7 | −4.793E−01 | 3.291E−01 | −1.271E−01 | 2.573E−02 | −2.130E−03 |
| S8 | 1.408E−02 | −8.550E−03 | 8.120E−03 | −2.880E−03 | 3.300E−04 |
| S9 | 4.089E−02 | 2.696E−02 | −1.689E−02 | 3.750E−03 | −3.100E−04 |
| S10 | −5.044E−02 | 3.765E−02 | −1.273E−02 | 2.160E−03 | −1.500E−04 |

Figure 9:
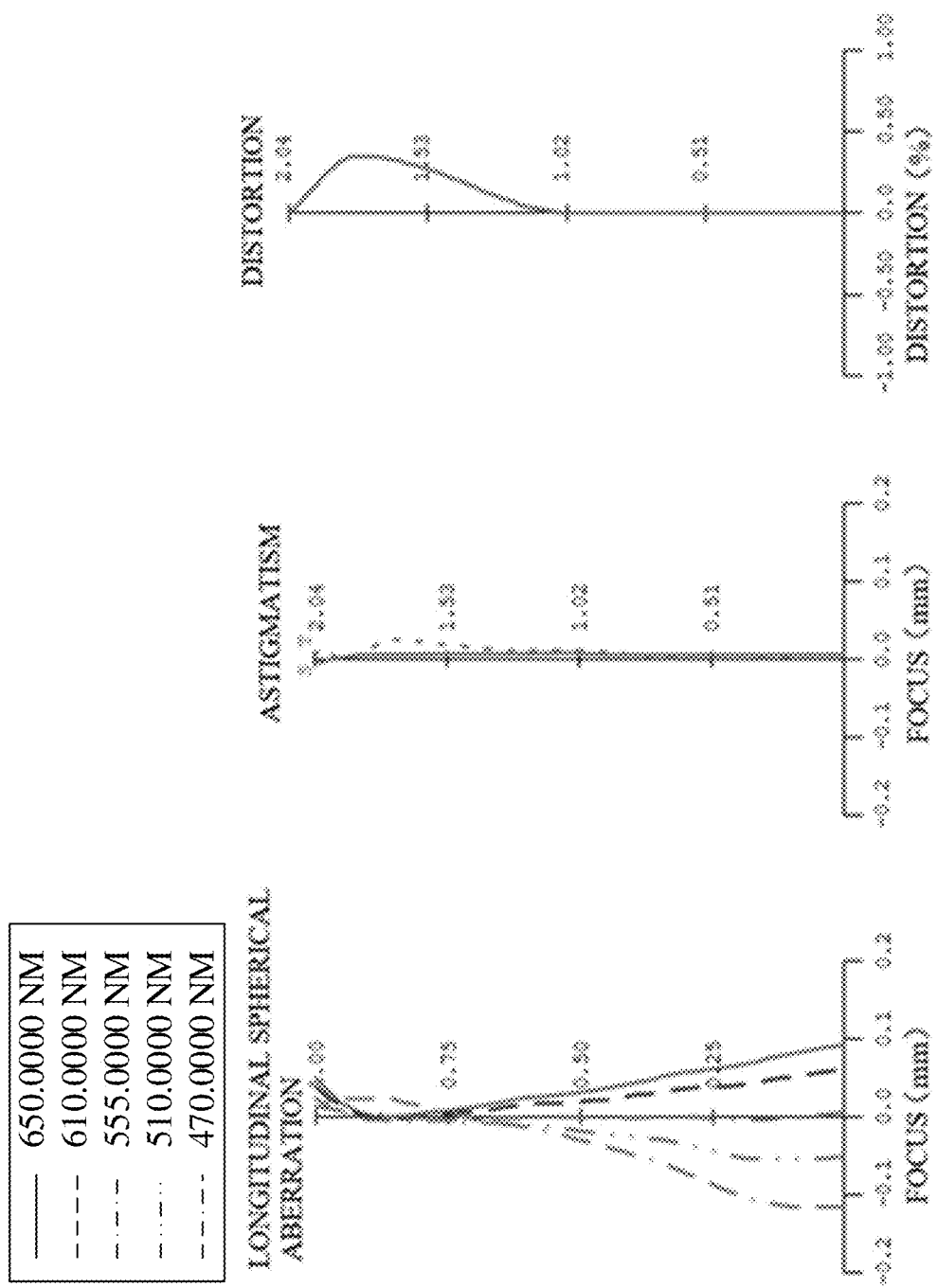
FIG. 9 illustrates the longitudinal spherical aberration curve, the astigmatic curve, and the distortion curve of the optical system of FIG. 8.

FIG. 9 illustrates the longitudinal spherical aberration curve, the astigmatic curve, and the distortion curve of the optical system of FIG. 8. The longitudinal spherical aberration curve represents focus deviation of lights of different wavelengths after passing through lenses in the optical system. The astigmatic curve represents sagittal field curvature and tangential field curvature. The distortion curve represents distortion values corresponding to different angles of view. As can be seen from FIG. 9, the optical system of this embodiment can achieve a good image quality.

Figure 10:
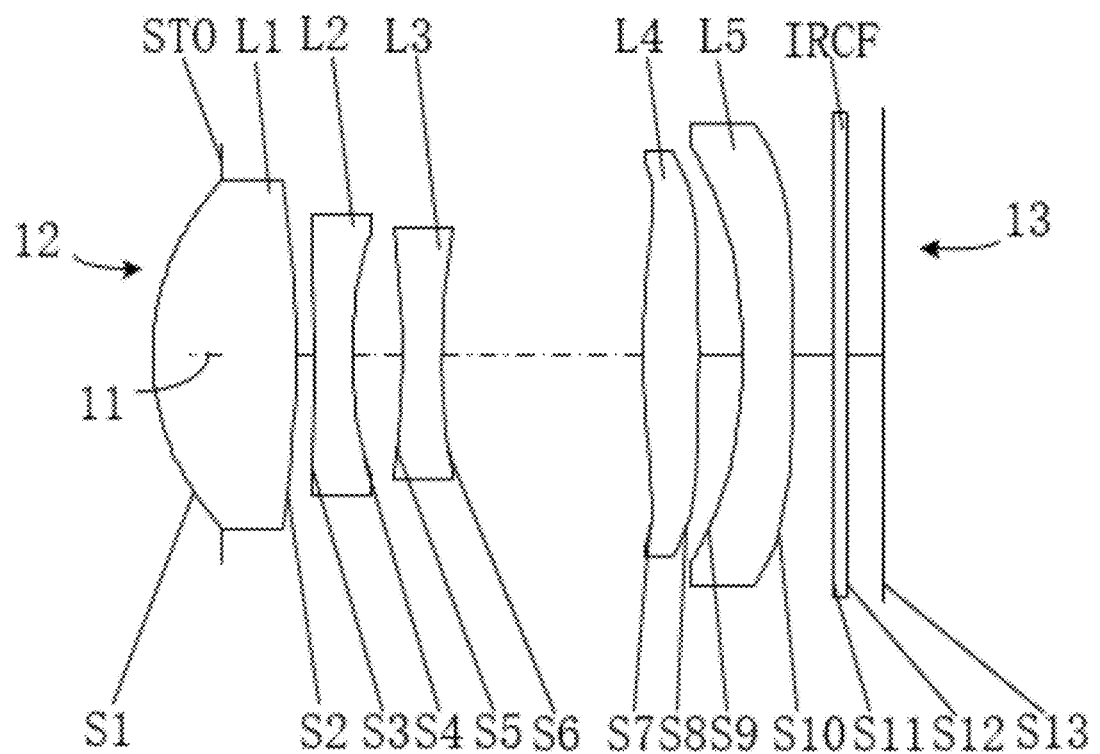
FIG. 10 is a schematic structural diagram illustrating an optical system according to an embodiment of the disclosure.

As shown in FIG. 10, a straight line 11 represents an optical axis, an object side is a side of a first lens L1 away from a second lens L2, and an image side 13 is a side of a fifth lens L5 away from a fourth lens L4. In an optical system according to this embodiment, there are a stop STO, a first lens L1, a second lens L2, a third lens L3, a fourth lens L4, a fifth lens L5, and an infrared filter IRCF.

The first lens L1 has a positive refractive power and is made of plastic. The first lens L1 has an object-side surface S1 which is convex both at the optical axis and at the circumference and an image-side surface S2 which is convex both at the optical axis and at the circumference. The object-side surface S1 and the image-side surface S2 are both aspheric surfaces.

The second lens L2 has a negative refractive power and is made of plastic. The second lens L2 has an object-side surface S3 which is concave at the optical axis and convex at the circumference and an image-side surface S4 which is concave both at the optical axis and at the circumference. The object-side surface S3 and the image-side surface S4 are both aspheric surfaces.

The third lens L3 has a negative refractive power and is made of plastic. The third lens L3 has an object-side surface S5 which is concave both at the optical axis and at the circumference and an image-side surface S6 which is concave both at the optical axis and at the circumference. The object-side surface S5 and the image-side surface S6 are both aspheric surfaces.

The fourth lens L4 has a positive refractive power and is made of plastic. The fourth lens L4 has an object-side surface S7 which is convex at the optical axis and concave at the circumference and an image-side surface S8 which is convex both at the optical axis and at the circumference. The object-side surface S7 and the image-side surface S8 are both aspheric surfaces.

The fifth lens L5 has a negative refractive power and is made of plastic. The fifth lens L5 has an object-side surface S9 which is concave both at the optical axis and at the circumference and an image-side surface S10 which is convex both at the optical axis and at the circumference. The object-side surface S9 and the image-side surface S10 are both aspheric surfaces.

The stop STO may be arranged between the object side of the optical system and the fifth lens. The stop STO in this embodiment is arranged at a side of the first lens L1 away from the second lens L2 and configured to control the amount of incident light.

In a direction from the object side to the image side, the infrared filter IRCF is arranged after the fifth lens L5. The infrared filter IRCF includes an object-side surface S11 and an image-side surface S12. The infrared filter IRCF is used to filter out infrared light, such that light incident to an imaging surface is visible light. The visible light has a wavelength ranged from 380 nm-780 nm. The infrared filter IRCF is made of glass.

The imaging surface S13 is a surface where an image is formed by light of the captured object passing through the optical system.

Table 5a shows characteristics of the optical system of the embodiment, where the radius of curvature in this embodiment is radius of curvature of respective lens at the optical axis.

TABLE 5a

Optical system of FIG. 10
EFL = 6.93 mm, FNO = 2.44, FOV = 30.20°, TTL = 6.58 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | Spheric | Infinity | Infinity | | | | |
| STO | Stop | Aspheric | Infinity | −0.609 | | | | |
| S1 | First | Aspheric | 1.911 | 1.292 | plastic | 1.54 | 56.11 | 2.92 |
| S2 | lens | Aspheric | −7.298 | 0.161 | | | | |
| S3 | Second | Aspheric | −36.028 | 0.344 | plastic | 1.66 | 20.38 | −4.85 |
| S4 | lens | Aspheric | 3.566 | 0.450 | | | | |
| S5 | Third | Aspheric | −5.315 | 0.360 | plastic | 1.54 | 56.11 | −6.84 |
| S6 | lens | Aspheric | 12.885 | 1.805 | | | | |
| S7 | Fourth | Aspheric | 7.396 | 0.500 | plastic | 1.66 | 20.38 | 7.01 |
| S8 | lens | Aspheric | −12.325 | 0.400 | | | | |
| S9 | Fifth | Aspheric | −2.627 | 0.450 | plastic | 1.54 | 56.11 | −7.09 |
| S10 | lens | Aspheric | −8.671 | 0.365 | | | | |
| S11 | Infrared | Spheric | Infinity | 0.110 | glass | | | |
| S12 | filter | Spheric | Infinity | 0.345 | | | | |
| S13 | Image surface | Spheric | Infinity | 0.000 | | | | |

Note:
a reference wavelength is 555 nm

In this table, EFL represents an effective focal length of the optical system, FNO represents an F-number of the optical system, FOV represents an angle of view in a diagonal direction of the optical system, TTL represents a distance from the object-side surface of the first lens to the imaging surface of the optical system on the optical axis.

Table 5b shows high order coefficients A4, A6, A8, A10, A12, A14, A16, A18, and A20 which can be used for respective aspheric surfaces S1, S2, S3, S4, S5, S6, S7, S8, S9, S10 in this embodiment.

TABLE 5b

| Surface number | K | A4 | A6 | A8 | A10 |
|---|---|---|---|---|---|
| S1 | −1.808E+00 | 3.150E−02 | −9.400E−04 | 5.050E−03 | −8.420E−03 |
| S2 | −7.787E+01 | −5.395E−02 | 1.062E−01 | −1.453E−01 | 1.612E−01 |
| S3 | −8.608E+01 | −9.688E−02 | 2.035E−01 | −2.729E−01 | 3.253E−01 |
| S4 | −5.455E+00 | −5.019E−02 | 1.654E−01 | −2.699E−01 | 6.022E−01 |

TABLE 5b-continued

| | | | | | |
|---|---|---|---|---|---|
| S5 | −2.048E+01 | 2.534E−02 | −2.270E−03 | −1.132E−01 | 3.384E−01 |
| S6 | −5.875E+01 | 7.911E−02 | −2.146E−02 | −3.933E−02 | 1.125E−01 |
| S7 | 1.751E+01 | 1.194E−02 | −1.072E−02 | −4.892E−02 | 8.226E−02 |
| S8 | −2.407E+00 | 7.588E−02 | −4.397E−02 | −8.105E−02 | 1.314E−01 |
| S9 | −6.536E−01 | 2.007E−01 | −2.252E−01 | 9.016E−02 | −1.925E−02 |
| S10 | 8.785E+00 | 1.215E−01 | −1.456E−01 | 4.735E−02 | 1.922E−02 |

| Surface number | A12 | A14 | A16 | A18 | A20 |
|---|---|---|---|---|---|
| S1 | 9.310E−03 | −6.470E−03 | 2.720E−03 | −6.400E−04 | 6.000E−05 |
| S2 | −1.412E−01 | 9.046E−02 | −3.878E−02 | 9.810E−03 | −1.100E−03 |
| S3 | −3.276E−01 | 2.589E−01 | −1.423E−01 | 4.687E−02 | −6.870E−03 |
| S4 | −1.190E+00 | 1.732E+00 | −1.597E+00 | 8.293E−01 | −1.822E−01 |
| S5 | −5.631E−01 | 5.829E−01 | −3.562E−01 | 1.151E−01 | −1.509E−02 |
| S6 | −1.440E−01 | 1.028E−01 | −3.639E−02 | 1.110E−03 | 1.820E−03 |
| S7 | −7.207E−02 | 3.966E−02 | −1.405E−02 | 2.910E−03 | −2.600E−04 |
| S8 | −9.180E−02 | 3.856E−02 | −1.064E−02 | 1.820E−03 | −1.400E−04 |
| S9 | 2.997E−02 | −2.848E−02 | 1.131E−02 | −2.040E−03 | 1.400E−04 |
| S10 | −2.174E−02 | 8.210E−03 | −1.670E−03 | 1.900E−04 | −1.000E−05 |

Figure 11:
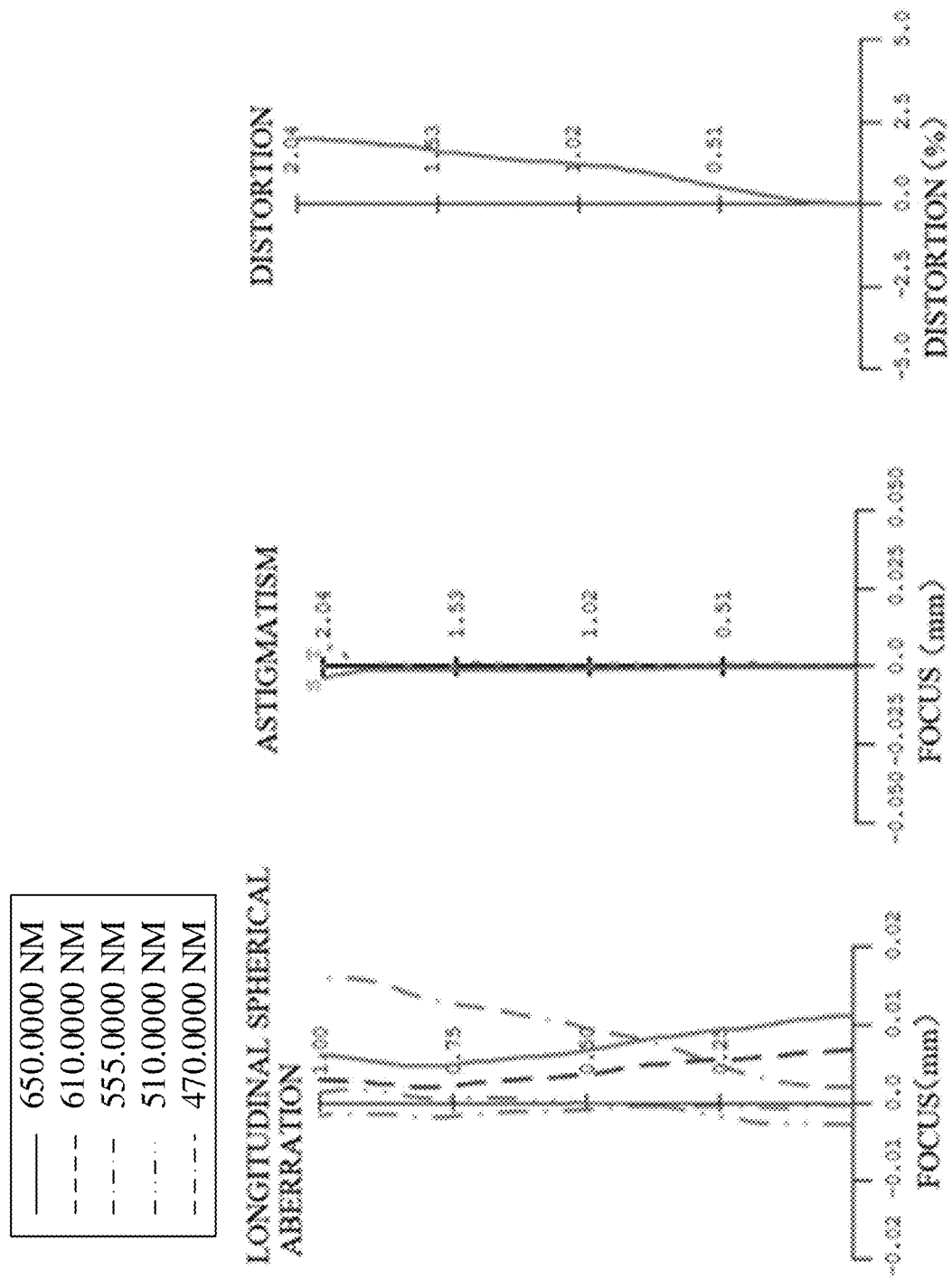
FIG. 11 illustrates the longitudinal spherical aberration curve, the astigmatic curve, and the distortion curve of the optical system of FIG. 10.

FIG. 11 illustrates the longitudinal spherical aberration curve, the astigmatic curve, and the distortion curve of the optical system of FIG. 10. The longitudinal spherical aberration curve represents focus deviation of lights of different wavelengths after passing through lenses in the optical system. The astigmatic curve represents sagittal field curvature and tangential field curvature. The distortion curve represents distortion values corresponding to different angles of view. As can be seen from FIG. 11, the optical system of this embodiment can achieve a good image quality.

Figure 12:
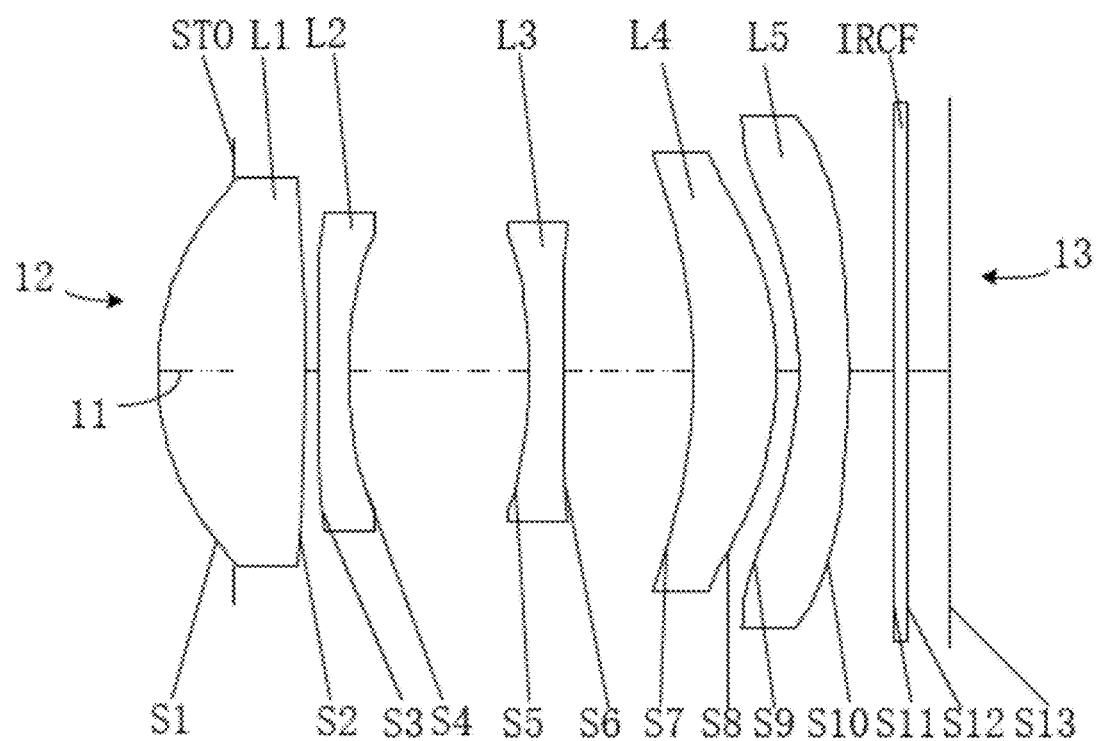
FIG. 12 is a schematic structural diagram illustrating an optical system according to an embodiment of the disclosure.

As shown in FIG. 12, a straight line 11 represents an optical axis, an object side is a side of a first lens L1 away from a second lens L2, and an image side 13 is a side of a fifth lens L5 away from a fourth lens L4. In an optical system according to this embodiment, there are a stop STO, a first lens L1, a second lens L2, a third lens L3, a fourth lens L4, a fifth lens L5, and an infrared filter IRCF.

The first lens L1 has a positive refractive power and is made of plastic. The first lens L1 has an object-side surface S1 which is convex both at the optical axis and at the circumference and an image-side surface S2 which is convex both at the optical axis and at the circumference. The object-side surface S1 and the image-side surface S2 are both aspheric surfaces.

The second lens L2 has a negative refractive power and is made of plastic. The second lens L2 has an object-side surface S3 which is convex both at the optical axis and at the circumference and an image-side surface S4 which is concave both at the optical axis and at the circumference. The object-side surface S3 and the image-side surface S4 are both aspheric surfaces.

The third lens L3 has a negative refractive power and is made of plastic. The third lens L3 has an object-side surface S5 which is concave both at the optical axis and at the circumference and an image-side surface S6 which is convex at the optical axis and concave at the circumference. The object-side surface S5 and the image-side surface S6 are both aspheric surfaces.

The fourth lens L4 has a positive refractive power and is made of plastic. The fourth lens L4 has an object-side surface S7 which is concave both at the optical axis and at the circumference and an image-side surface S8 which is convex both at the optical axis and at the circumference. The object-side surface S7 and the image-side surface S8 are both aspheric surfaces.

The fifth lens L5 has a negative refractive power and is made of plastic. The fifth lens L5 has an object-side surface S9 which is concave both at the optical axis and at the circumference and an image-side surface S10 which is convex both at the optical axis and at the circumference. The object-side surface S9 and the image-side surface S10 are both aspheric surfaces.

The stop STO may be arranged between the object side of the optical system and the fifth lens. The stop STO in this embodiment is arranged at a side of the first lens L1 away from the second lens L2 and configured to control the amount of incident light.

In a direction from the object side to the image side, the infrared filter IRCF is arranged after the fifth lens L5. The infrared filter IRCF includes an object-side surface S11 and an image-side surface S12. The infrared filter IRCF is used to filter out infrared light, such that light incident to an imaging surface is visible light. The visible light has a wavelength ranged from 380 nm-780 nm. The infrared filter IRCF is made of glass.

The imaging surface S13 is a surface where an image is formed by light of the captured object passing through the optical system.

Table 6a shows characteristics of the optical system of the embodiment, where the radius of curvature in this embodiment is radius of curvature of respective lens at the optical axis.

TABLE 6a

Optical system of FIG. 12
EFL = 7.12 mm, FNO = 2.2, FOV = 32.00°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | Spheric | Infinity | Infinity | | | | |
| STO | Stop | Aspheric | Infinity | −0.622 | | | | |
| S1 | First | Aspheric | 1.838 | 1.194 | plastic | 1.54 | 56.11 | 3.22 |
| S2 | lens | Aspheric | −30.912 | 0.100 | | | | |
| S3 | Second | Aspheric | 13.820 | 0.250 | plastic | 1.66 | 20.38 | −5.90 |
| S4 | lens | Aspheric | 3.039 | 1.454 | | | | |
| S5 | Third | Aspheric | −3.717 | 0.286 | plastic | 1.54 | 56.11 | −9.47 |
| S6 | lens | Aspheric | −13.602 | 1.040 | | | | |
| S7 | Fourth | Aspheric | −4.206 | 0.673 | plastic | 1.66 | 20.38 | 6.23 |
| S8 | lens | Aspheric | −2.223 | 0.181 | | | | |
| S9 | Fifth | Aspheric | −1.858 | 0.402 | plastic | 1.54 | 56.11 | −6.37 |
| S10 | lens | Aspheric | −4.295 | 0.365 | | | | |
| S11 | Infrared | Spheric | Infinity | 0.110 | glass | | | |
| S12 | filter | Spheric | Infinity | 0.345 | | | | |
| S13 | Image surface | Spheric | Infinity | 0.000 | | | | |

Note:
a reference wavelength is 555 nm

In this table, EFL represents an effective focal length of the optical system, FNO represents an F-number of the optical system, FOV represents an angle of view in a diagonal direction of the optical system, TTL represents a distance from the object-side surface of the first lens to the imaging surface of the optical system on the optical axis.

Table 6b shows high order coefficients A4, A6, A8, A10, A12, A14, A16, A18, and A20 which can be used for respective aspheric surfaces S1, S2, S3, S4, S5, S6, S7, S8, S9, S10 in this embodiment.

TABLE 6b

| Surface number | K | A4 | A6 | A8 | A10 |
|---|---|---|---|---|---|
| S1 | −1.836E+00 | 3.403E−02 | −4.620E−03 | 1.429E−02 | −2.461E−02 |
| S2 | −9.900E+01 | −1.033E−01 | 2.171E−01 | −1.575E−01 | −8.539E−02 |
| S3 | −1.472E+01 | −1.602E−01 | 3.275E−01 | −7.152E−02 | −6.963E−01 |
| S4 | −3.497E+00 | −5.053E−02 | 1.691E−01 | 7.280E−03 | −3.005E−01 |
| S5 | −2.347E+00 | −2.593E−02 | 3.578E−02 | 6.290E−03 | −2.847E−01 |
| S6 | −9.900E+01 | 2.564E−02 | 4.207E−02 | 1.071E−02 | −1.457E−01 |
| S7 | −2.986E−01 | −2.067E−02 | 4.781E−02 | −1.185E−01 | 2.030E−01 |
| S8 | −1.913E+00 | 3.910E−02 | 6.690E−03 | −2.199E−01 | 3.529E−01 |
| S9 | −2.099E+00 | 2.205E−01 | −1.752E−01 | −1.833E−01 | 4.162E−01 |
| S10 | −1.624E+00 | 1.470E−01 | −1.433E−01 | 2.892E−02 | 3.789E−02 |

| Surface number | A12 | A14 | A16 | A18 | A20 |
|---|---|---|---|---|---|
| S1 | 2.814E−02 | −2.067E−02 | 9.260E−03 | −2.300E−03 | 2.400E−04 |
| S2 | 2.858E−01 | −2.752E−01 | 1.394E−01 | −3.746E−02 | 4.230E−03 |
| S3 | 1.386E+00 | −1.339E+00 | 7.339E−01 | −2.187E−01 | 2.763E−02 |
| S4 | 3.859E−02 | 9.784E−01 | −1.562E+00 | 1.005E+00 | −2.427E−01 |
| S5 | 8.831E−01 | −1.465E+00 | 1.311E+00 | −5.899E−01 | 1.039E−01 |
| S6 | 3.336E−01 | −4.590E−01 | 3.544E−01 | −1.389E−01 | 2.144E−02 |
| S7 | −2.174E−01 | 1.472E−01 | −6.125E−02 | 1.416E−02 | −1.380E−03 |
| S8 | −2.799E−01 | 1.314E−01 | −3.727E−02 | 5.940E−03 | −4.100E−04 |
| S9 | −3.269E−01 | 1.400E−01 | −3.467E−02 | 4.670E−03 | −2.700E−04 |
| S10 | −3.305E−02 | 1.227E−02 | −2.480E−03 | 2.700E−04 | −1.000E−05 |

Figure 13:
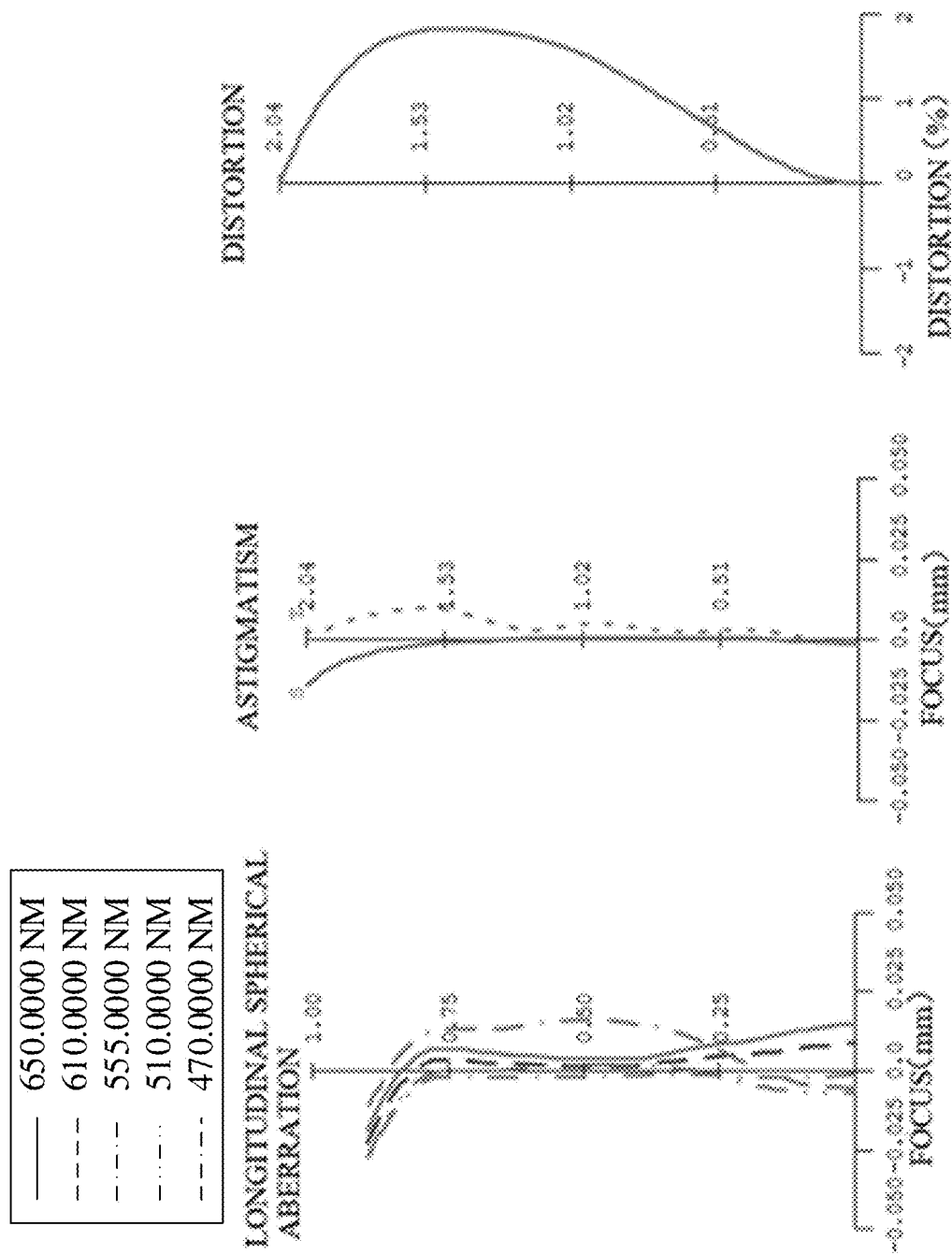
FIG. 13 illustrates the longitudinal spherical aberration curve, the astigmatic curve, and the distortion curve of the optical system of FIG. 12.

FIG. 13 illustrates the longitudinal spherical aberration curve, the astigmatic curve, and the distortion curve of the optical system of FIG. 12. The longitudinal spherical aberration curve represents focus deviation of lights of different wavelengths after passing through lenses in the optical system. The astigmatic curve represents sagittal field curvature and tangential field curvature. The distortion curve represents distortion values corresponding to different angles of view. As can be seen from FIG. 13, the optical system of this embodiment can achieve a good image quality.

Figure 14:
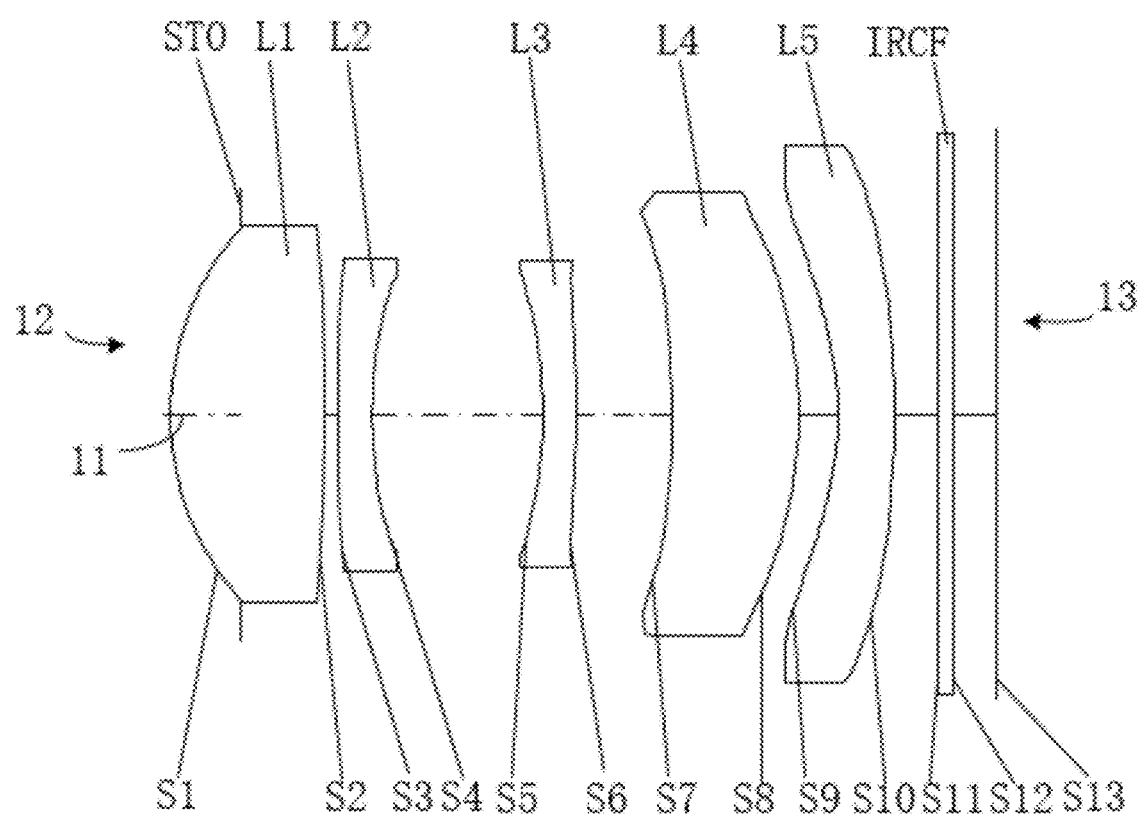
FIG. 14 is a schematic structural diagram illustrating an optical system according to an embodiment of the disclosure.

As shown in FIG. 14, a straight line 11 represents an optical axis, an object side is a side of a first lens L1 away from a second lens L2, and an image side 13 is a side of a fifth lens L5 away from a fourth lens L4. In an optical system according to this embodiment, there are a stop STO, a first lens L1, a second lens L2, a third lens L3, a fourth lens L4, a fifth lens L5, and an infrared filter IRCF.

The first lens L1 has a positive refractive power and is made of plastic. The first lens L1 has an object-side surface S1 which is convex both at the optical axis and at the circumference and an image-side surface S2 which is convex both at the optical axis and at the circumference. The object-side surface S1 and the image-side surface S2 are both aspheric surfaces.

The second lens L2 has a negative refractive power and is made of plastic. The second lens L2 has an object-side surface S3 which is convex both at the optical axis and at the circumference and an image-side surface S4 which is concave both at the optical axis and at the circumference. The object-side surface S3 and the image-side surface S4 are both aspheric surfaces.

The third lens L3 has a negative refractive power and is made of plastic. The third lens L3 has an object-side surface S5 which is concave both at the optical axis and at the circumference and an image-side surface S6 which is convex at the optical axis and concave at the circumference. The object-side surface S5 and the image-side surface S6 are both aspheric surfaces.

The fourth lens L4 has a positive refractive power and is made of plastic. The fourth lens L4 has an object-side surface S7 which is concave both at the optical axis and at the circumference and an image-side surface S8 which is convex both at the optical axis and at the circumference. The object-side surface S7 and the image-side surface S8 are both aspheric surfaces.

The fifth lens L5 has a negative refractive power and is made of plastic. The fifth lens L5 has an object-side surface S9 which is concave both at the optical axis and at the circumference and an image-side surface S10 which is convex both at the optical axis and at the circumference. The object-side surface S9 and the image-side surface S10 are both aspheric surfaces.

The stop STO may be arranged between the object side of the optical system and the fifth lens. The stop STO in this embodiment is arranged at a side of the first lens L1 away from the second lens L2 and configured to control the amount of incident light.

In a direction from the object side to the image side, the infrared filter IRCF is arranged after the fifth lens L5. The infrared filter IRCF includes an object-side surface S11 and an image-side surface S12. The infrared filter IRCF is used to filter out infrared light, such that light incident to an imaging surface is visible light. The visible light has a wavelength ranged from 380 nm-780 nm. The infrared filter IRCF is made of glass.

The imaging surface S13 is a surface where an image is formed by light of the captured object passing through the optical system.

Table 7a shows characteristics of the optical system of the embodiment, where the radius of curvature in this embodiment is radius of curvature of respective lens at the optical axis.

TABLE 7a

Optical system of FIG. 14
EFL = 6.67 mm, FNO = 2.48, FOV = 34.00°, TTL = 6.4 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | Spheric | Infinity | Infinity | | | | |
| STO | Stop | Aspheric | Infinity | −0.5410 | | | | |
| S1 | First | Aspheric | 1.844 | 1.1934 | plastic | 1.54 | 56.11 | 3.21 |
| S2 | lens | Aspheric | −26.515 | 0.1088 | | | | |
| S3 | Second | Aspheric | 14.382 | 0.2597 | plastic | 1.66 | 20.38 | −5.95 |
| S4 | lens | Aspheric | 3.084 | 1.3197 | | | | |
| S5 | Third | Aspheric | −3.126 | 0.2600 | plastic | 1.54 | 56.11 | −11.68 |
| S6 | lens | Aspheric | −6.312 | 0.7417 | | | | |
| S7 | Fourth | Aspheric | −6.431 | 0.9779 | plastic | 1.66 | 20.38 | 6.32 |
| S8 | lens | Aspheric | −2.700 | 0.3066 | | | | |
| S9 | Fifth | Aspheric | −1.703 | 0.4381 | plastic | 1.54 | 56.11 | −6.45 |
| S10 | lens | Aspheric | −3.600 | 0.3371 | | | | |
| S11 | Infrared | Spheric | Infinity | 0.1100 | glass | | | |
| S12 | filter | Spheric | Infinity | 0.3450 | | | | |
| S13 | Image surface | Spheric | Infinity | 0.0000 | | | | |

Note:
a reference wavelength is 555 nm

In this table, EFL represents an effective focal length of the optical system, FNO represents an F-number of the optical system, FOV represents an angle of view in a diagonal direction of the optical system, TTL represents a distance from the object-side surface of the first lens to the imaging surface of the optical system on the optical axis.

Table 7b shows high order coefficients A4, A6, A8, A10, A12, A14, A16, A18, and A20 which can be used for respective aspheric surfaces S1, S2, S3, S4, S5, S6, S7, S8, S9, S10 in this embodiment.

TABLE 7b

| Surface number | K | A4 | A6 | A8 | A10 |
|---|---|---|---|---|---|
| S1 | −1.819E+00 | 3.418E−02 | −2.440E−03 | 6.200E−03 | −6.720E−03 |
| S2 | −9.900E+01 | −8.565E−02 | 1.830E−01 | −1.790E−01 | 6.950E−02 |
| S3 | −2.139E+01 | −1.487E−01 | 3.027E−01 | −1.649E−01 | −3.144E−01 |
| S4 | −3.599E+00 | −5.408E−02 | 1.629E−01 | 4.510E−02 | −5.885E−01 |

TABLE 7b-continued

| | | | | | |
|---|---|---|---|---|---|
| S5 | −3.817E+00 | −5.298E−02 | 1.400E−01 | −3.375E−01 | 8.252E−01 |
| S6 | −5.683E+01 | −2.245E−02 | 1.149E−01 | −1.256E−01 | 1.604E−01 |
| S7 | 7.826E+00 | −5.200E−03 | −3.994E−02 | 2.144E−01 | −5.216E−01 |
| S8 | −2.370E+00 | 3.207E−02 | −5.103E−01 | 1.535E−02 | 4.201E−02 |
| S9 | −2.424E+00 | 2.058E−01 | −2.445E−01 | 1.466E−02 | 2.313E−01 |
| S10 | −2.433E+00 | 1.869E−01 | −1.983E−01 | 4.555E−02 | 6.310E−02 |

| Surface number | A12 | A14 | A16 | A18 | A20 |
|---|---|---|---|---|---|
| S1 | 4.100E−03 | −9.200E−04 | −3.700E−04 | 2.600E−04 | −5.000E−05 |
| S2 | 4.174E−02 | −7.078E−02 | 3.959E−02 | −1.063E−02 | 1.160E−03 |
| S3 | 8.044E−01 | −8.574E−01 | 5.071E−01 | −1.619E−01 | 2.182E−02 |
| S4 | 1.117E+00 | −9.788E−01 | 3.236E−01 | 7.505E−02 | −5.805E−02 |
| S5 | −1.602E+00 | 1.983E+00 | −1.440E+00 | 5.590E−01 | −8.966E−02 |
| S6 | −3.163E−01 | 4.124E−01 | −2.827E−01 | 9.570E−02 | −1.273E−02 |
| S7 | 7.116E−01 | −5.981E−01 | 3.014E−01 | −8.205E−02 | 9.210E−03 |
| S8 | −6.592E−02 | 4.560E−02 | −1.782E−02 | 3.890E−03 | −3.700E−04 |
| S9 | −2.449E−01 | 1.241E−01 | −3.482E−02 | 5.210E−03 | −3.300E−04 |
| S10 | −6.113E−02 | 2.530E−02 | −5.730E−03 | 7.000E−04 | −4.000E−05 |

Figure 15:
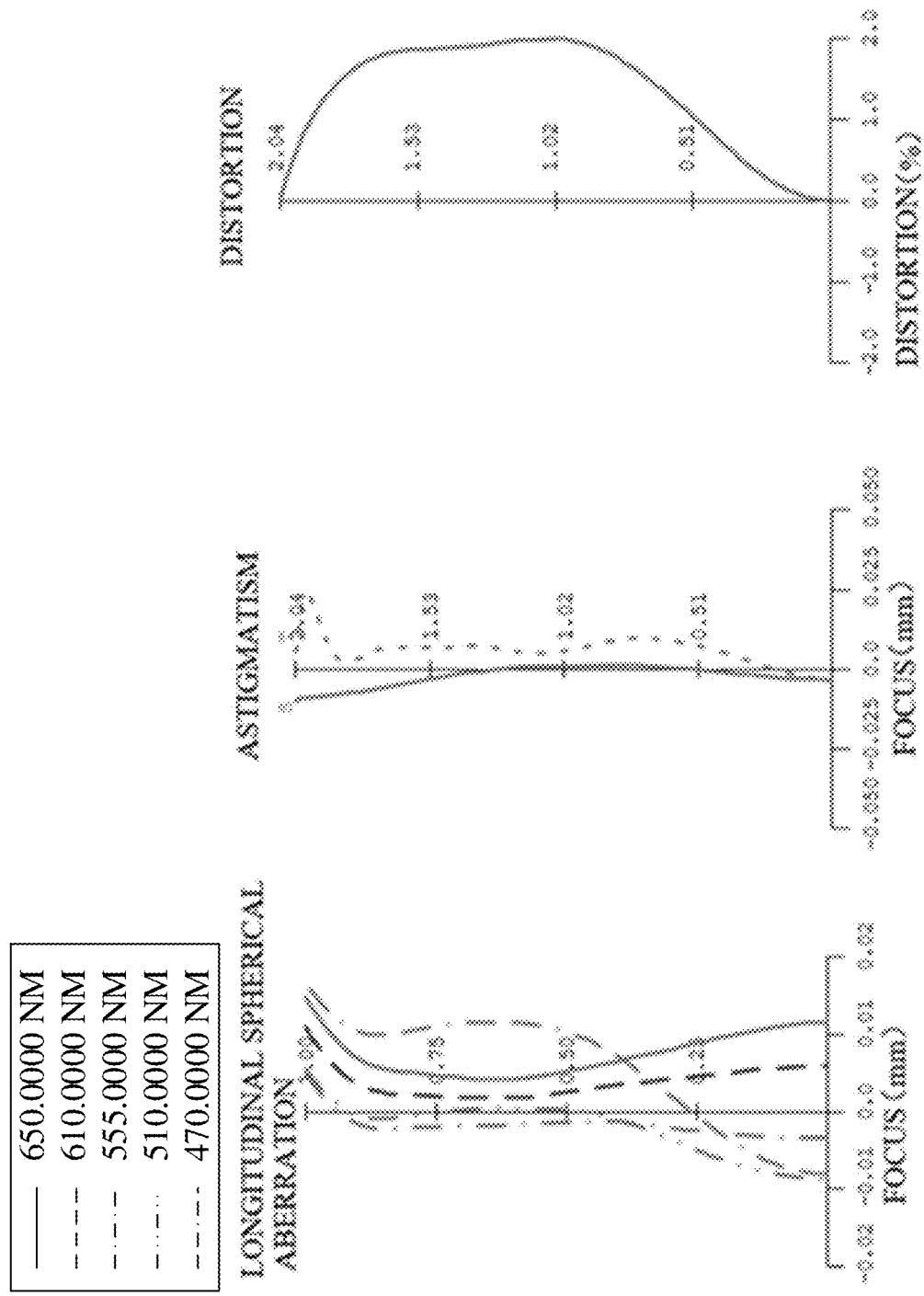
FIG. 15 illustrates the longitudinal spherical aberration curve, the astigmatic curve, and the distortion curve of the optical system of FIG. 14.

FIG. 15 illustrates the longitudinal spherical aberration curve, the astigmatic curve, and the distortion curve of the optical system of FIG. 14. The longitudinal spherical aberration curve represents focus deviation of lights of different wavelengths after passing through lenses in the optical system. The astigmatic curve represents sagittal field curvature and tangential field curvature. The distortion curve represents distortion values corresponding to different angles of view. As can be seen from FIG. 15, the optical system of this embodiment can achieve a good image quality.

Table 8 shows values of ftgtl3/ftltl3, FNO*L1SD/tan FOV, L1SD/Imgh, EFL/f1, airL2/TTL, (|R9|−|R10|)/(|R9|+|R10|), DL/TTL, FNO/TTL, TTL/EFL, and EFL/Imgh of the optical systems of FIG. 2 to FIG. 14.

TABLE 8

| | ftgtl3/ftltl3 | FNO * L1SD/tanFOV | L1SD/Imgh | EFL/f1 | airL2/TTL |
|---|---|---|---|---|---|
| Optical system of FIG. 2 | 0.52 | 12.84 | 0.75 | 2.29 | 0.24 |
| Optical system of FIG. 4 | 0.58 | 12.91 | 0.75 | 2.27 | 0.32 |
| Optical system of FIG. 6 | 0.47 | 12.86 | 0.75 | 2.43 | 0.25 |
| Optical system of FIG. 8 | 0.55 | 12.68 | 0.73 | 1.47 | 0.24 |
| Optical system of FIG. 10 | 0.69 | 11.14 | 0.70 | 2.37 | 0.07 |
| Optical system of FIG. 12 | 0.61 | 11.40 | 0.70 | 2.21 | 0.23 |
| Optical system of FIG. 14 | 0.65 | 9.90 | 0.66 | 2.08 | 0.21 |

| | (|R9| − |R10|)/(|R9| + |R10|) | DL/TTL | FNO /TTL | TTL/EFL | EFL/Imgh |
|---|---|---|---|---|---|
| Optical system of FIG. 2 | −0.28 | 0.47 | 0.38 | 0.86 | 1.83 |
| Optical system of FIG. 4 | −0.43 | 0.48 | 0.38 | 0.86 | 1.83 |
| Optical system of FIG. 6 | 0.05 | 0.48 | 0.38 | 0.86 | 1.83 |
| Optical system of FIG. 8 | −0.29 | 0.46 | 0.39 | 0.86 | 1.83 |
| Optical system of FIG. 10 | −0.53 | 0.44 | 0.37 | 0.95 | 1.70 |
| Optical system of FIG. 12 | −0.40 | 0.45 | 0.39 | 0.90 | 1.74 |
| Optical system of FIG. 14 | −0.36 | 0.42 | 0.39 | 0.96 | 1.63 |

As can be seen from the Table 8, all of the embodiments satisfy 0.25<ftgtl3/ftltl3<0.8, 7 mm<FNO*L1SD/tan FOV<15 mm, 0.5<L1SD/Imgh<0.8, 1<EFL/f1<3, 0.05<airL2/TTL<0.35, −1<(|R9|−|R10|)/(|R9|+|R10|)<0.1, 0.3<DL/TTL<0.6, FNO/TTL<0.5 mm$^{-1}$, 0.8<TTL/EFL<1, 1.5<EFL/Imgh<2.

The above are some embodiments of this disclosure. It should be pointed out that for those of ordinary skill in the art, without departing from the principle of this disclosure, several improvements and modifications can be made, and these improvements and modifications are also considered to be within the protection scope of this disclosure.

What is claimed is:

1. An optical system, comprising a plurality of lenses arranged in order from an object side to an image side, the plurality of lenses consisting of:

a first lens with a positive refractive power, the first lens having an object-side surface which is convex at an optical axis;

a second lens with a refractive power;

a third lens with a refractive power, the third lens having an object-side surface which is concave at the optical axis;

a fourth lens with a positive refractive power, the fourth lens having an image-side surface which is convex at the optical axis; and a fifth lens with a refractive power, the fifth lens having an object-side surface which is concave at the optical axis and an image-side surface which is convex at the optical axis;

wherein the optical system satisfies the following expressions:

0.25<ftgtl3/ftltl3<0.8, wherein ftgtl3 represents a shortest distance from the object-side surface of the third lens to an image-side surface of the third lens in a direction parallel to the optical axis, and ftltl3 represents a longest distance from the object-side surface of the third lens to the image-side surface of the third lens in the direction parallel to the optical axis; and 7 mm<FNO*L1SD/tan FOV<15 mm, wherein FNO represents an F-number of the optical system, L1SD represents an effective diameter of the first lens, and tan FOV represents a tangent value of a maximum angle of view of the optical system.

2. The optical system of claim 1, wherein the optical system satisfies the following expression:

0.5<L1SD/Imgh<0.8, wherein L1SD represents an effective diameter of the first lens, and Imgh represents half of a diagonal length of an effective pixel region on an imaging surface of the optical system.

3. The optical system of claim 1, wherein the optical system satisfies the following expression:

1<EFL/f1<3, wherein EFL represents an effective focal length of the optical system, and f1 represents a focal length of the first lens.

4. The optical system of claim 1, wherein the optical system satisfies the following expression:

0.05<airL2/TTL<0.35, wherein airL2 represents a distance from an image-side surface of the second lens to the object-side surface of the third lens on the optical axis, and TTL represents a distance from the object-side surface of the first lens to an imaging surface of the optical system on the optical axis.

5. The optical system of claim 1, wherein the optical system satisfies the following expression:

−1<(|R9|−|R10|)/(|R9|+|R10|)<0.1, wherein R9 represents a radius of curvature of the object-side surface of the fifth lens at the optical axis, and R10 represents a radius of curvature of the image-side surface of the fifth lens at the optical axis.

6. The optical system of claim 1, wherein the optical system further comprises a stop, and the optical system satisfies the following expression:

0.3<DL/TTL<0.6, wherein DL represents an effective diameter of the stop of the optical system, and TTL represents a distance from the object-side surface of the first lens to an imaging surface of the optical system on the optical axis.

7. The optical system of claim 1, wherein the optical system satisfies the following expression:

FNO/TTL<0.5 mm$^{-1}$, wherein FNO represents an F-number of the optical system, and TTL represents a distance from the object-side surface of the first lens to an imaging surface of the optical system on the optical axis.

8. The optical system of claim 1, wherein the optical system satisfies the following expression:

1.5<EFL/Imgh<2, wherein EFL represents an effective focal length of the optical system, and Imgh represents half of a diagonal length of an effective pixel region on an imaging surface of the optical system.

9. A lens module, comprising a photosensitive element and an optical system, wherein the photosensitive element is arranged at an image side of the optical system, and the optical system comprising a plurality of lenses arranged in order from an object side to the image side, the plurality of lenses consisting of:
a first lens with a positive refractive power, the first lens having an object-side surface which is convex at an optical axis;
a second lens with a refractive power;
a third lens with a refractive power, the third lens having an object-side surface which is concave at the optical axis;
a fourth lens with a positive refractive power, the fourth lens having an image-side surface which is convex at the optical axis; and
a fifth lens with a refractive power, the fifth lens having an object-side surface which is concave at the optical axis and an image-side surface which is convex at the optical axis;
wherein the optical system satisfies the following expressions:

0.25<ftgtl3/ftltl3<0.8, wherein ftgtl3 represents a shortest distance from the object-side surface of the third lens to an image-side surface of the third lens in a direction parallel to the optical axis, and ftltl3 represents a longest distance from the object-side surface of the third lens to the image-side surface of the third lens in the direction parallel to the optical axis; and 7 mm<FNO*L1SD/tan FOV<15 mm, wherein FNO represents an F-number of the optical system, L1SD represents an effective diameter of the first lens, and tan FOV represents a tangent value of a maximum angle of view of the optical system.

10. The lens module of claim 9, wherein the optical system satisfies the following expression:

0.5<L1SD/Imgh<0.8, wherein L1SD represents an effective diameter of the first lens, and Imgh represents half of a diagonal length of an effective pixel region on an imaging surface of the optical system.

11. The lens module of claim 9, wherein the optical system satisfies the following expression:

1<EFL/f1<3, wherein EFL represents an effective focal length of the optical system, and f1 represents a focal length of the first lens.

12. The lens module of claim 9, wherein the optical system satisfies the following expression:

0.05<airL2/TTL<0.35, wherein airL2 represents a distance from an image-side surface of the second lens to the object-side surface of the third lens on the optical axis, and TTL represents a distance from the object-side surface of the first lens to an imaging surface of the optical system on the optical axis.

13. An optical system, comprising a plurality of lenses arranged in order from an object side to an image side, the plurality of lenses consisting of:
a first lens with a positive refractive power, the first lens having an object-side surface which is convex at an optical axis;
a second lens with a refractive power;
a third lens with a refractive power, the third lens having an object-side surface which is concave at the optical axis;

a fourth lens with a positive refractive power, the fourth lens having an image-side surface which is convex at the optical axis; and a fifth lens with a refractive power, the fifth lens having an object-side surface which is concave at the optical axis and an image-side surface which is convex at the optical axis;

wherein the optical system satisfies the following expressions:

$0.25 < \text{ftgtl3/ftltl3} < 0.8$, wherein ftgtl3 represents a shortest distance from the object-side surface of the third lens to an image-side surface of the third lens in a direction parallel to the optical axis, and ftltl3 represents a longest distance from the object-side surface of the third lens to the image-side surface of the third lens in the direction parallel to the optical axis; and $-1 < (|R9| - |R10|)/(|R9| + |R10|) < 0.1$, wherein R9 represents a radius of curvature of the object-side surface of the fifth lens at the optical axis, and R10 represents a radius of curvature of the image-side surface of the fifth lens at the optical axis.

14. The optical system of claim 13, wherein the optical system satisfies the following expression:

$7 \text{ mm} < \text{FNO}*\text{L1SD/tan FOV} < 15 \text{ mm}$, wherein FNO represents an F-number of the optical system, L1SD represents an effective diameter of the first lens, and tan FOV represents a tangent value of a maximum angle of view of the optical system.

15. The optical system of claim 13, wherein the optical system satisfies the following expression:

$0.5 < \text{L1SD/Imgh} < 0.8$, wherein L1SD represents an effective diameter of the first lens, and Imgh represents half of a diagonal length of an effective pixel region on an imaging surface of the optical system.

16. The optical system of claim 13, wherein the optical system satisfies the following expression:

$1 < \text{EFL}/f1 < 3$, wherein EFL represents an effective focal length of the optical system, and f1 represents a focal length of the first lens.

17. The optical system of claim 13, wherein the optical system satisfies the following expression:

$0.05 < \text{air}L2/\text{TTL} < 0.35$, wherein airL2 represents a distance from an image-side surface of the second lens to the object-side surface of the third lens on the optical axis, and TTL represents a distance from the object-side surface of the first lens to an imaging surface of the optical system on the optical axis.

18. The optical system of claim 13, wherein the optical system further comprises a stop, and the optical system satisfies the following expression:

$0.3 < \text{DL/TTL} < 0.6$, wherein DL represents an effective diameter of the stop of the optical system, and TTL represents a distance from the object-side surface of the first lens to an imaging surface of the optical system on the optical axis.

19. The optical system of claim 13, wherein the optical system satisfies the following expression:

$\text{FNO/TTL} < 0.5 \text{ mm}^{-1}$, wherein FNO represents an F-number of the optical system, and TTL represents a distance from the object-side surface of the first lens to an imaging surface of the optical system on the optical axis.

20. The optical system of claim 13, wherein the optical system satisfies the following expression:

$0.8 < \text{TTL/EFL} < 1$, wherein TTL represents a distance from the object-side surface of the first lens to an imaging surface of the optical system on the optical axis, and EFL represents an effective focal length of the optical system.

* * * * *